US008433908B2

(12) United States Patent
Hataoka et al.

(10) Patent No.: US 8,433,908 B2
(45) Date of Patent: Apr. 30, 2013

(54) CARD ISSUING SYSTEM, CARD ISSUING SERVER, CARD ISSUING METHOD AND PROGRAM

(75) Inventors: Jun Hataoka, Saitama (JP); Tomoharu Hikita, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 633 days.

(21) Appl. No.: 12/388,117

(22) Filed: Feb. 18, 2009

(65) Prior Publication Data
US 2009/0222662 A1 Sep. 3, 2009

(30) Foreign Application Priority Data

Mar. 3, 2008 (JP) ................... 2008-052729

(51) Int. Cl.
*H04L 29/06* (2006.01)
(52) U.S. Cl.
USPC .................. 713/169; 726/9; 726/10
(58) Field of Classification Search ............. 726/9, 10
See application file for complete search history.

(56) References Cited

U.S. PATENT DOCUMENTS

| 6,549,912 | B1 | 4/2003 | Chen |
| 7,757,273 | B2 * | 7/2010 | Kipnis et al. ............ 726/4 |
| 2003/0070068 | A1 | 4/2003 | Medvinsky |
| 2003/0149871 | A1 | 8/2003 | Medvinsky |
| 2003/0154405 | A1 * | 8/2003 | Harrison .............. 713/201 |
| 2008/0005567 | A1 | 1/2008 | Johnson |
| 2008/0059797 | A1 * | 3/2008 | Tokuno et al. ......... 713/171 |
| 2009/0235352 | A1 | 9/2009 | Schrijen et al. |

FOREIGN PATENT DOCUMENTS

| CN | 1954345 A | 4/2007 |
| JP | 2005-505991 | 2/2005 |
| JP | 2005-517347 | 6/2005 |
| JP | 2006-246015 | 9/2006 |
| JP | WO2006093148 | * 9/2006 |
| WO | WO 01/69475 A1 | 9/2001 |
| WO | WO 2005/119606 A1 | 12/2005 |
| WO | WO 2006/061754 A1 | 6/2006 |

OTHER PUBLICATIONS

Larry J. Hughes, Jr., "Internet security", Japan, Impress Co., Ltd., First edition, Internet Exciting Technology Series. Feb. 21, 1997, pp. 86-108.

(Continued)

*Primary Examiner* — Kambiz Zand
*Assistant Examiner* — Ghodrat Jamshidi
(74) *Attorney, Agent, or Firm* — Oblon, Spivak, McClelland, Maier & Neustadt, L.L.P.

(57) ABSTRACT

The present invention provides a service providing server including an authentication ticket creating unit for encrypting access authentication information and creating an authentication ticket, and an authentication ticket transmitting unit for transmitting the authentication ticket to a card issuing server; where the card issuing server includes an authentication ticket verifying unit for decrypting the authentication ticket and verifying the authentication ticket, a verification result notifying unit for notifying the verification result of the authentication ticket to the service providing server, a connection information transmitting unit for transmitting connection information for connecting to the card issuing server to the service providing server along with the verification result of the authentication ticket, and an authentication information verifying unit for comparing and verifying the access authentication information of the authentication ticket and access authentication information stored in the IC chip of the information processing terminal.

21 Claims, 17 Drawing Sheets

OTHER PUBLICATIONS

Hisafumi Yoshinaga, et al., "Development of i-mode FeliCa", NTT DoCoMo Technical journal, Japan, Corporate judicial person Electric Press Association, vol. 12, No. 3, Oct. 1, 2004, pp. 25-32.

Konstantinos Markantonakis, et al., "An Overview of the GlobalPlatform Smart Card Specification", Information Security Technical Report, vol. 8, No. 1, XP002538627, Apr. 29, 2003, pp. 17-29.

Extended Search Report issued Feb. 2, 2012 in Europe Application No. 11188391.4.

* cited by examiner

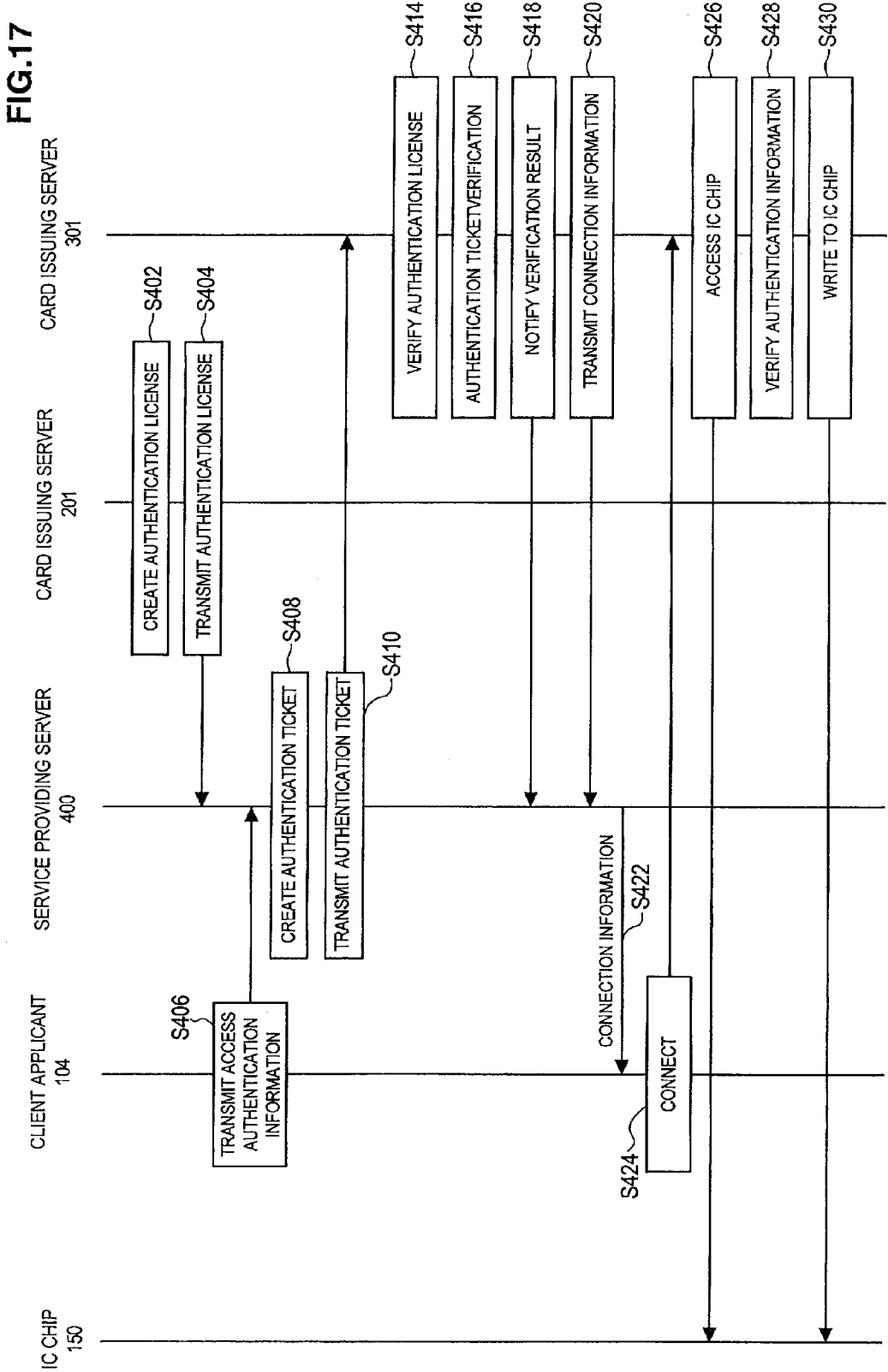

CARD ISSUING SYSTEM, CARD ISSUING SERVER, CARD ISSUING METHOD AND PROGRAM

CROSS REFERENCES TO RELATED APPLICATIONS

The present invention contains subject matter related to Japanese Patent Application JP 2008-052729 filed in the Japan Patent Office on JP Mar. 3, 2008, the entire contents of which being incorporated herein by reference.

BACKGROUND OF THE INVENTION

1. Field of the Invention

The present invention relates to card issuing systems, card issuing servers, card issuing methods, and programs, in particular, to a card issuing system capable of efficiently preventing unauthorized access to an IC chip, a card issuing server, a card issuing method, and a program.

2. Description of the Related Art

In recent years, a technique of writing a card number of a card issued by a service provider such as a financial institution, type of service that can be used by the relevant card, and the like to an IC chip mounted in a portable telephone and the like thereby allowing the portable telephone mounted with the IC chip to be used similar to the card issued by the service provider is realized. Normally, the IC chip has tamper-proof property, and the data written on the IC chip is securely held. In order to make access to or write data to the IC chip holding secure information, a system for accessing the IC chip is desirably built or information for accessing the IC chip is desirably disclosed. To this end, a card issuing representative makes access to or writes data to the IC chip upon request of the service provider.

When accessing the IC chip mounted on the portable telephone and the like through a network, a request from a client applicant controlling the IC chip is desired. Therefore, in order to access the IC chip and issue a card, mutual authentication is desired among three parties, the card issuing representative, the service provider, and the client applicant. The authentication among the three parties can be realized using a one-time password, and the like. The authentication using the one-time password includes the following methods.

First, after the authentication between the client applicant of the portable telephone and the server of the service provider is carried out, mutual authentication is carried out between the server of the service provider (hereinafter referred to as service providing server), and the server of the card issuing representative (hereinafter referred to as card issuing server). The card issuing server notifies the one-time password (token) for authenticating a request from the client applicant to the client applicant of the portable telephone through the service providing server. The card issuing server then can specify the client applicant of the portable telephone mounted with the IC chip to which the card information is to be written. The client applicant of the portable telephone notifies the notified token to the card issuing server in time of transmission of the request to the card issuing server, and the card issuing server performs authentication of the client applicant of the portable telephone by verifying the notified token.

In the above method, the authentication of the client applicant can be performed only in time of transmission of the request from the client applicant. The token may be acquired off-line in advance, but in this case, the holding period of the token in the card issuing server becomes long, and thus the load on the system increases. In order to solve such issue, a technique of realizing the mutual authentication among the three parties using an authentication license generated based on individualizing information transmitted from the client applicant is disclosed (e.g., Patent Document 1). In Japanese Patent Application Laid-Open No. 2006-246015, the service providing server, which is transmitted with the individualizing information from the client applicant, generates the authentication license, and the generated authentication license is transmitted from the client applicant to the card issuing server. The card issuing server verifies the transmitted authentication license to perform authentication of the client applicant, the portable terminal, and the service providing server.

[Patent document 1] Japanese Patent Application Laid-Open No. 2006-246015

SUMMARY OF THE INVENTION

When the card issuing server accesses the IC chip mounted on the portable telephone through a network such as the Internet, the legitimacy of the IC chip is desirably verified in advance. However, although the mutual authentication among the three parties of the client applicant, the service providing server, and the card issuing server can be realized in Japanese Patent Application Laid-Open No. 2006-246015, the card issuing server may not verify the IC chip in advance, or detect card information etc. stored on the IC chip. The service providing server is not able to efficiently check the processing result performed by the card issuing server.

The present invention addresses the above-identified, and other issues, where it is desirable to provide a new and improved card issuing system capable of acquiring individual information of the IC chip before access to the card information stored on the IC chip, verifying the IC chip in advance, and efficiently preventing unauthorized access to the IC chip, a card issuing server, a card issuing method, and a program.

According to an embodiment of the present invention, there is provided a card issuing system including an information processing terminal mounted with an IC chip, a service providing server and a card issuing server connectable to the information processing terminal by way of a network. The service providing server includes an authentication ticket creating unit for encrypting access authentication information for authenticating access by the information processing terminal to create an authentication ticket, and an authentication ticket transmitting unit for transmitting the authentication ticket created by the authentication ticket creating unit to the card issuing server.

The card issuing server includes an authentication ticket verifying unit for decrypting the authentication ticket transmitted by the authentication ticket transmitting unit, and verifying the authentication ticket, a verification result notifying unit for notifying the verification result of the authentication ticket verified by the authentication ticket verifying unit to the service providing server, a connection information transmitting unit for transmitting connection information for connecting to the card issuing server to the service providing server along with the verification result of the authentication ticket, and an authentication information verifying unit for comparing and verifying the access authentication information of the authentication ticket and access authentication information stored in the IC chip of the information processing terminal. The information processing terminal includes a connecting unit for connecting to the card issuing server based on the connection information, and an authentication information storage unit, arranged in the IC chip, for storing the access authentication information.

According to such configuration, the service providing server encrypts access authentication information for authenticating access by the information processing terminal to create an authentication ticket, and such authentication ticket is transmitted to the card issuing server. The card issuing server verifies the authentication ticket, and notifies the verification result to the service providing server and transmits connection information for connecting to the card issuing server. The information processing terminal transmitted with the connection information through the service providing server then connects to the card issuing server, so that the card issuing server can access the IC chip of the information processing terminal.

According to another embodiment of the present invention, there is provided a card issuing server connectable with an information processing terminal mounted with an IC chip and a service providing server by way of a network, wherein the service providing server encrypts access authentication information for authenticating access by the information processing terminal to create an authentication ticket; and the card issuing server includes an authentication ticket receiving unit for receiving the authentication ticket created by the service providing server, an authentication ticket verifying unit for decrypting the authentication ticket received by the authentication ticket receiving unit, and verifying the authentication ticket, a verification result notifying unit for notifying the verification result of the authentication ticket verified by the authentication ticket verifying unit to the service providing server, a connection information transmitting unit for transmitting connection information for connecting to the card issuing server to the service providing server along with the verification result of the authentication ticket, and an authentication information verifying unit for comparing and verifying the access authentication information of the authentication ticket and access authentication information stored in the IC chip of the information processing terminal.

According to such configuration, the service providing server encrypts access authentication information for authenticating access by the information processing terminal to create an authentication ticket, and such authentication ticket is transmitted to the card issuing server. The card issuing server verifies the authentication ticket, and notifies the verification result to the service providing server and transmits connection information for connecting to the card issuing server. The information processing terminal transmitted with the connection information through the service providing server then connects to the card issuing server, so that the card issuing server can access the IC chip of the information processing terminal.

Furthermore, the service providing server may add an electronic signature to the access authentication information using an authentication private key to create the authentication ticket; and the authentication ticket verifying unit may verify the electronic signature added to the authentication ticket using an authentication public key corresponding to the authentication private key.

Moreover, the card issuing server is connected to a service acting server acting for the service providing server by way of the network; the service providing server encrypts information of a service licensed to the service acting server to create an authentication license, and the service acting server adds access authentication information for authenticating access by the information processing terminal to the authentication license, and encrypts to create the authentication ticket; and the card issuing server includes an authentication license acquiring unit for decrypting the authentication ticket and acquiring the authentication license, and an authentication license verifying unit for decrypting the authentication license acquired by the authentication license acquiring unit and verifying the authentication license; and the authentication ticket verifying unit may verify the authentication ticket based on the authentication license verified by the authentication license verifying unit.

According to such configuration, the service providing server creates an authentication license capable of executing only the process to request to the service acting server, and creates an authentication ticket based on the authentication license. With the multi-stage configuration of the authentication ticket, the executable process can be limited while maintaining security when the service providing server requests the service acting server for an alternate processing. With the multi-stage configuration of using different authentication keys for the authentication license and the authentication ticket, authentication becomes mutually possible even when the service acting server, or the like carries out the process for the service providing server.

The service providing server may add a first electronic signature to user authentication information using a first authentication private key to create the authentication license, and the service acting server may add the access authentication information to the authentication license, and further adds a second electronic signature using a second authentication private key to create the authentication ticket; the authentication license verifying unit may verify the first electronic signature added to the authentication license using a first authentication public key corresponding to the first authentication private key; and the authentication ticket verifying unit may verify the second electronic signature added to the authentication ticket using a second authentication public key corresponding to the second authentication private key included in the authentication license verified by the authentication license verifying unit.

According to such configuration, with the multi-stage configuration of using different authentication keys for the authentication license and the authentication ticket, authentication becomes mutually possible and the process to be carried out can be limited even when the service acting server, or the like carries out the process for the service providing server.

The access authentication information may include at least information of a process used by the information processing terminal, identification information of the IC chip, and issuing source information of the IC chip. The information of the process to be used by the information terminal is the information of the process related to the service provided by the service provider. Therefore, authentication of the IC chip can be carried out based on the authentication ticket.

The access authentication information includes write judgment information for judging whether write to the IC chip is possible; and the authentication information verifying unit may judge write to the IC chip based on the write judgment information. Therefore, the process with respect to only a specific IC card correspondence terminal and the IC card can be executed. The access authentication information may include limiting information of an equipment enabled with data write to the IC chip or use of data written on the IC chip.

The service providing server may be authenticated by challenge response authentication. The challenge response authentication unit may authenticate the service acting server by the challenge response authentication. Therefore, authentication of higher security can be carried out.

An access status notifying unit for notifying an access status to the IC chip of the information processing terminal in response to a request of the service providing server may be arranged. The access status notifying unit may include an access authentication information transmitting unit for transmitting the access authentication information stored in the IC chip to the service providing server in response to a request of the service providing server. Therefore, the service providing server can grasp the accurate processing result on the client applicant when the client applicant is not reliable, when the communication path between the client applicant and the service providing server is not reliable, or the like.

According to another embodiment of the present invention, there is provided a card issuing system including an information processing terminal mounted with an IC chip, a service providing server and a card issuing server connectable to the information processing terminal by way of a network. The service providing server includes an authentication ticket creating unit for encrypting access authentication information for authenticating access by the information processing terminal to create an authentication ticket, and an authentication ticket transmitting unit for transmitting the authentication ticket created by the authentication ticket creating unit to the information processing terminal. The information processing terminal includes an authentication ticket transmitting unit for transmitting the authentication ticket transmitted by the authentication ticket transmitting unit arranged in the service providing server to the card issuing server.

The card issuing server includes an authentication ticket verifying unit for decrypting the authentication ticket transmitted by the authentication ticket transmitting unit arranged in the information processing terminal, and verifying the authentication ticket, a verification result notifying unit for notifying the verification result of the authentication ticket verified by the authentication ticket verifying unit to the information processing terminal, a connection information transmitting unit for transmitting connection information for connecting to the card issuing server to the information processing terminal along with the verification result of the authentication ticket, and an authentication information verifying unit for comparing and verifying the access authentication information of the authentication ticket and access authentication information stored in the IC chip of the information processing terminal.

According to such configuration, the authentication ticket created by the service providing server is transmitted to the client applicant of the information processing terminal, and the client applicant connects to the card issuing server and transmits the authentication ticket so that the authentication process of the IC card can be executed. Therefore, the communication between the service providing server and the card issuing server is reduced, and the building man-hours of the service providing server can be reduced.

According to another embodiment of the present invention, there is provided a card issuing server connectable with an information processing terminal mounted with an IC chip and a service providing server by way of a network, wherein the service providing server encrypts access authentication information for authenticating access by the information processing terminal to create an authentication ticket; and the card issuing server includes an authentication ticket receiving unit for receiving the authentication ticket created by the service providing server through the information processing terminal, an authentication ticket verifying unit for decrypting the authentication ticket received by the authentication ticket receiving unit, and verifying the authentication ticket, a verification result notifying unit for notifying the verification result of the authentication ticket verified by the authentication ticket verifying unit to the information processing terminal, and an authentication information verifying unit for comparing and verifying the access authentication information of the authentication ticket and access authentication information stored in the IC chip of the information processing terminal.

According to another embodiment of the present invention, there is provided a card issuing system including an information processing terminal mounted with an IC chip, a service providing server, a service acting server, and a card issuing server connectable to the information processing terminal by way of a network. The service providing server includes an authentication license creating unit for encrypting information of a service licensed to the service acting server to create an authentication license, and an authentication license transmitting unit for transmitting the authentication license created by the authentication license creating unit to the service acting server. The service acting server includes an authentication ticket creating unit for adding access authentication information for authenticating access by the information processing terminal to the authentication license transmitted by the authentication license transmitting unit, and encrypting to create an authentication ticket, and an authentication ticket transmitting unit for transmitting the authentication ticket created by the authentication ticket creating unit to the card issuing server.

The card issuing server includes an authentication license acquiring unit for decrypting the authentication ticket transmitted by the authentication ticket transmitting unit, and acquiring the authentication license, an authentication license verifying unit for decrypting the authentication license acquired by the authentication license acquiring unit and verifying the authentication license, and an authentication ticket verifying unit for verifying the authentication ticket based on the authentication license verified by the authentication license verifying unit.

According to another embodiment of the present invention, there is provided a card issuing method realized using an information processing terminal mounted with an IC chip, a service providing server and a card issuing server connectable to the information processing terminal by way of a network, wherein the service providing server includes the steps of: encrypting access authentication information for authenticating access by the information processing terminal to create an authentication ticket; and transmitting the authentication ticket to the card issuing server, the card issuing server includes the steps of: decrypting the authentication ticket transmitted by the service providing server, and verifying the authentication ticket; notifying the verification result of the verified authentication ticket to the service providing server; transmitting connection information for connecting to the card issuing server to the service providing server along with the verification result of the authentication ticket; and comparing and verifying the access authentication information of the authentication ticket and access authentication information stored in the IC chip of the information processing terminal, and the information processing terminal includes the step of connecting to the card issuing server based on the connection information.

According to another embodiment of the present invention, there is provided a card issuing method realized using an information processing terminal mounted with an IC chip, a service providing server and a card issuing server connectable to the information processing terminal by way of a network, wherein the service providing server includes the steps of: encrypting access authentication information for authenticating access by the information processing terminal to create an authentication ticket; and transmitting the authentication ticket to the information processing terminal, the information processing terminal includes the step of transmitting the authentication ticket transmitted by the service providing server to the card issuing server, and the card issuing server includes the steps of: decrypting the authentication ticket transmitted by the authentication ticket transmitting unit arranged in the information processing terminal, and verifying the authentication ticket; notifying the verification result of the verified authentication ticket to the information processing terminal; transmitting connection information for connecting to the card issuing server to the information processing terminal along with the verification result of the authentication ticket; and comparing and verifying the access authentication information of the authentication ticket and access authentication information stored in the IC chip of the information processing terminal.

According to another embodiment of the present invention, there is provided a card issuing method realized using an information processing terminal mounted with an IC chip, a service providing server, a service acting server, and a card issuing server connectable to the information processing terminal by way of a network, wherein the service providing server includes the steps of: encrypting information of a service licensed to the service acting server to create an authentication license; and transmitting the authentication license to the service acting server, the service acting server includes the steps of: adding access authentication information for authenticating access by the information processing terminal to the authentication license transmitted by the authentication license transmitting unit; and encrypting to create an authentication ticket; and transmitting the authentication ticket to the card issuing server, and the card issuing server includes the steps of: decrypting the authentication ticket, and acquiring the authentication license; decrypting the acquired authentication license and verifying the authentication license; and verifying the authentication ticket based on the verified authentication license.

According to another embodiment of the present invention, there is provided a program for functioning a computer as a card issuing server connectable to an information processing terminal mounted with an IC chip and a service providing server by way of a network, wherein the service providing server encrypts access authentication information for authenticating access by the information processing terminal to create an authentication ticket, and the card issuing server includes an authentication ticket receiving unit for receiving the authentication ticket created by the service providing server an authentication ticket verifying unit for decrypting the authentication ticket received by the authentication ticket receiving unit, and verifying the authentication ticket, a verification result notifying unit for notifying the verification result of the authentication ticket verified by the authentication ticket verifying unit to the service providing server, a connection information transmitting unit for transmitting connection information for connecting to the card issuing server to the service providing server along with the verification result of the authentication ticket, and an authentication information verifying unit for comparing and verifying the access authentication information of the authentication ticket and access authentication information stored in the IC chip of the information processing terminal.

Furthermore, such computer may function as the card issuing server, where the card issuing server is connected to a service acting server acting for the service providing server by way of the network; the service providing server encrypts information of a service licensed to the service acting server to create an authentication license, and the service acting server adds access authentication information for authenticating access by the information processing terminal to the authentication license, and encrypts to create the authentication ticket; and the card issuing server includes an authentication license acquiring unit for decrypting the authentication ticket and acquiring the authentication license, and an authentication license verifying unit for decrypting the authentication license acquired by the authentication license acquiring unit and verifying the authentication license; and the authentication ticket verifying unit verifies the authentication ticket based on the authentication license verified by the authentication license verifying unit.

According to another embodiment of the present invention, there is provided a program for functioning a computer as a card issuing server connectable with an information processing terminal mounted with an IC chip and a service providing server by way of a network, wherein the service providing server encrypts access authentication information for authenticating access by the information processing terminal to create an authentication ticket; and the card issuing server includes an authentication ticket receiving unit for receiving the authentication ticket created by the service providing server through the information processing terminal, an authentication ticket verifying unit for decrypting the authentication ticket received by the authentication ticket receiving unit, and verifying the authentication ticket, a verification result notifying unit for notifying the verification result of the authentication ticket verified by the authentication ticket verifying unit to the information processing terminal, and an authentication information verifying unit for comparing and verifying the access authentication information of the authentication ticket and access authentication information stored in the IC chip of the information processing terminal.

According to the embodiments of the present invention, the individual information of the IC chip is acquired before access to the card information stored in the IC chip to verify the IC chip in advance, so that unauthorized access to the IC chip can be efficiently prevented.

BRIEF DESCRIPTION OF THE DRAWINGS

FIG. 17 is a timing chart showing a flow of a card issuing method according to the embodiment.

DETAILED DESCRIPTION OF THE PREFERRED EMBODIMENTS

Figure 1:
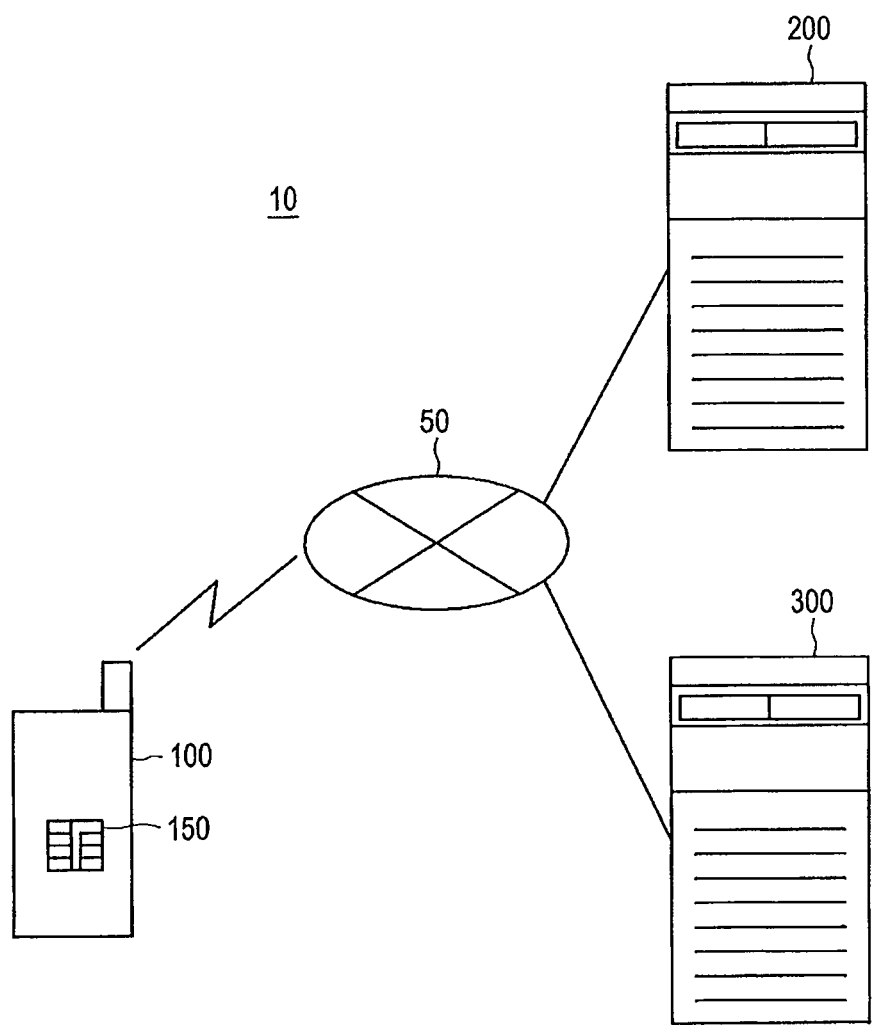
FIG. 1 is an explanatory view showing a configuration example of a card issuing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(First Embodiment)

A brief overview of a card issuing system according to a first embodiment of the present invention will be first described. FIG. 1 is an explanatory view showing a configuration example of a card issuing system 10 according to the present embodiment. As shown in FIG. 1, the card issuing system 10 is configured to include an information processing terminal 100, a service providing server 200, a card issuing server 300, a network 50, and the like. The information processing terminal 100, the service providing server 200, and the card issuing server 300 are connected through the network 50. The network 50 is configured to include public line network such as Internet, telephone line network, and satellite communication network; dedicated line network such as WAN, LAN, and IP-VPN; and the like, and may be wired or wireless.

The information processing terminal 100 is a portable terminal mounted with an IC chip 150. Description will be made below with a portable telephone mounted with the IC chip 150 applied to the information processing terminal of the present invention as one example of the information processing terminal 100, but is not limited to such example. The information processing terminal 100 may be a PDA (Personal digital Assistants), a wrist watch, a portable music player, or the like mounted with the IC chip. The IC chip 150 may be incorporated in the information processing device 100, or the IC chip may be connected by contact or non-contact communication.

The IC chip 150 is a secure memory having a tamper-proof property. The IC chip 150 may be contact communicable or may be non-contact communicable. The information processing terminal 100 may be loaded with a plurality of IC chips, or each IC chip may be used according to application. The information processing terminal 100 mounted with one IC chip capable of providing service provided by the service providing server 200 will be mainly described below by way of example. The connection through the network 50 in the information processing terminal 100 is not only TCP/IP communication by HTTP, HTTPS, or the like, and refers to the general communication function of the information processing terminal 100 and includes infrared communication, communication by two-dimensional barcode, e-mail, and the like.

The service providing server 200 executes write or read of data to the IC chip 150 mounted on the information processing terminal 100 to provide services to the user using the information processing terminal 100. The service providing server 200 is a server of the service provider such as financial institution, and may be a server of a card company and the like. The service providing server 200 makes a request to the card issuing server 300 for an IC card issuing process such as write or read of data to the IC chip 150. When the service providing server 200 makes a request to issue an IC card to the card issuing server 300, the information processing terminal 100 is desirably authenticated.

The service providing server 200 has a function of connecting with the information processing terminal 100 through the network 50, and creating an authentication ticket for issuing an IC card according to the request of the information processing terminal 100. Here, IC card means card information to be written to the IC chip mounted in the information processing terminal 100, and the IC card issuing process means write or read of data to the IC chip 150.

The authentication ticket created by the service providing server 200 will be hereinafter described in detail, but the authentication ticket mainly includes individual information of the IC card, write data to the IC card, and the like. In the present embodiment, one service providing server is connected to the network, but is not limited to such example, and a plurality of service providing servers may be connected to the network. In this case, the information processing terminal 100 can use services provided from each of the plurality of service providing servers.

The card issuing server 300 has a function of connecting to the information processing terminal 100 through the network 50, and carrying out card access such as registration and deletion of application, and write and read of the card information of the IC card with respect to the IC chip 150 of the information processing terminal 100 based on the request from the service providing server 200. The card issuing server 300 may be a server of a card issuing representative which carries out card issuing.

The card issuing server 300 holds key information for authenticating the IC chip 140, information for registration and deletion of applications that differ for each of the plurality of service providing servers 200, and the like to make an access to the IC card. The card issuing server 300 verifies the authentication ticket created by the service providing server 200 to authenticate the information processing terminal 100. After the authentication ticket is verified, and the legitimacy of the information processing terminal 100 is confirmed, the IC card issuing process by the card issuing server 300 is executed.

Therefore, as the authentication ticket is verified before the card issuing server 300 executes the IC card issuing process, the individual information of the IC chip 150 may be acquired to verify the legitimacy of the IC chip 150 or the card information etc. of the IC card written on the IC chip 150 may be checked in advance.

The card issuing server 300 can notify the access result to the IC card, the information on the IC card, and the like to the service providing server 200 using a one-time password or the like along with the verification of the authentication ticket. The result of the access process can be checked, as needed, such as when the card issuing server 300 is performing the IC card issuing process or after the issuing process, so that unauthorized access can be efficiently prevented.

Figure 2:
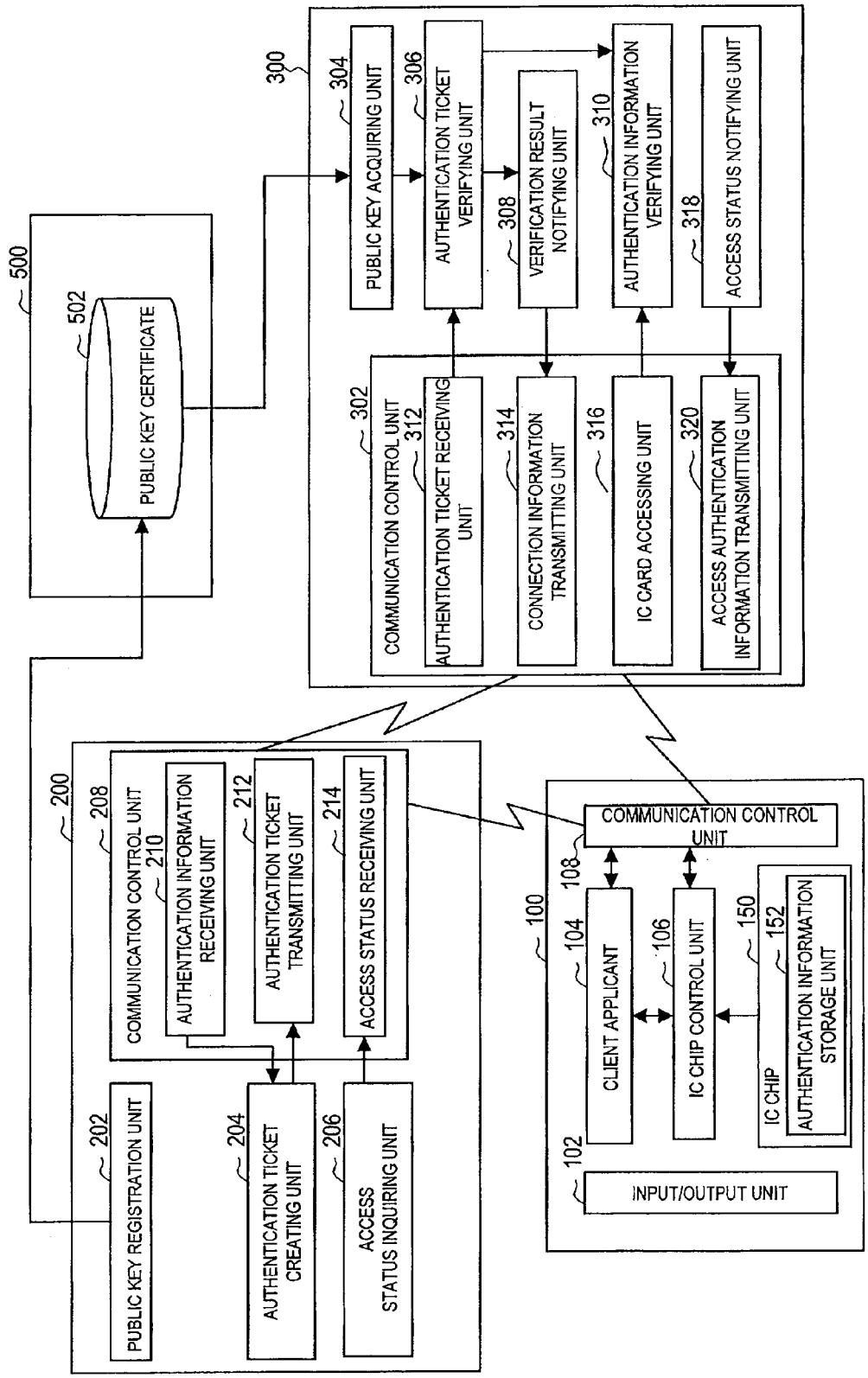
FIG. 2 is a block diagram showing function configurations of an information processing terminal, a service providing server, and a card issuing server according to the embodiment.

The brief overview of the card issuing system 10 has been described above. Detailed configuration of the information processing terminal 100, the service providing server 200, and the card issuing server 300 of the card issuing system 10 will now be described. FIG. 2 is a block diagram showing function configuration of the information processing terminal 100, the service providing server 200, and the card issuing server 300. As shown in FIG. 2, the information processing terminal 100 includes an input/output unit 102, a client applicant 104, an IC chip control unit 106, a communication control unit 108, the IC chip 150, and the like.

The client applicant 104 is a program in the information processing terminal 100, and has a function or providing service to the user using the information processing terminal 100, or making an authentication request for issuing the IC card. The client applicant 104 also has a function of transmitting individual information of the IC chip 150 to the service providing server 200 through the communication control unit 108. The IC chip control unit 106 has a function of exchanging data between the IC chip 150 and the client applicant 104 or with the communication control unit 108. The IC chip 150 is a secure memory having a tamper-proof property mounted on the information processing terminal 100, and has a function of contact communicating or non-contact communication with an external device. The IC chip 150 may include a CPU (Central Processing Unit), a ROM (Read Only Memory), a RAM (Random Access Memory), a storage unit, or the like. In the present embodiment, a case where the IC chip 150 is mainly a storage unit, and an authentication information storage unit 152 is arranged in the storage unit will be described.

The communication control unit 108 is a communication interface configured to include a communication device and the like for connecting to the network such as the Internet, and has a function of transmitting and receiving data with the service providing server 200 or the card issuing server 300 through the network.

The input/output unit 102 is an input and output interface provided in the information processing terminal 100. The input interface is a ten key, button, touch panel, or the like, and has a function of accepting input of the user. The output interface is a display device such as display indication or lamp, an audio output device such as speaker, or the like. The function configuration of the information processing terminal 100 has been described above.

The function configuration of the service providing server 200 will now be described. The service providing server 200 includes a public key registration unit 202, an authentication ticket creating unit 204, an access status inquiring unit 206, a communication control unit 208, and the like. The public key registration unit 202 has a function of registering in advance to a certificate authority 500, which issues a public key certificate, an authentication public key forming a pair with an authentication private key for adding an electronic signature to access authentication information to be hereinafter described. The authentication key for authentication may use the private key and the public key that form a pair, or may use a shared key shared with the card issuing server 300.

Encryption may be performed with a key of either an asymmetric key such as RSA, or a symmetric key such as DES or ASE. In the case of the symmetric key, a key is desirably distributed to the opponent confidentially, and thus is not directly distributed from the communication network and is distributed through means such as contents-certified mail and the like. In the present embodiment, a case of performing encryption and addition of electronic signature using a public key encryption method will be described.

The authentication ticket creating unit 204 has a function of encrypting the access authentication information for authenticating the access by the information processing terminal 100, and creating the authentication ticket. The access authentication information may be encrypted with the authentication private key, or an authentication ticket in which the electronic signature is added using the authentication private key may serve as the authentication ticket.

For instance, when using a hash with key (HMAC) for the encryption algorithm, the result of performing HMAC calculation with the access authentication information as input data and the key, which is shared in advance between the service providing server 200 and the card issuing server 300, as the key may be added as the electronic signature of the access authentication information. When using the RSA, the result of encrypting hash values with the authentication private key of the service providing server with the access authentication information as input data may be added as the electronic signature of the access authentication information, or the access authentication information may be encrypted with the authentication private key.

Figure 3:
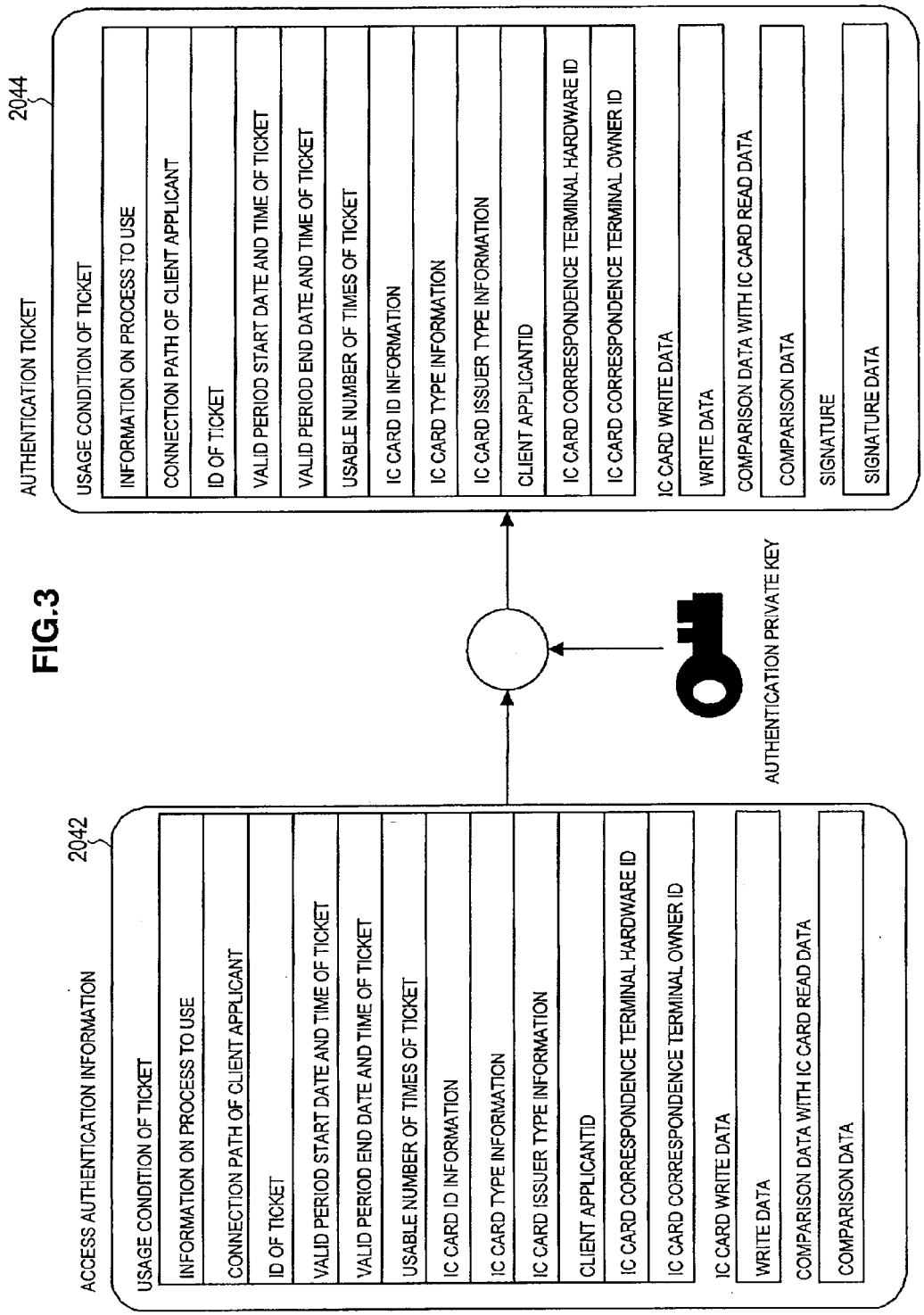
FIG. 3 is an explanatory view describing contents of access authentication information and authentication ticket according to the embodiment.

The access authentication information and the authentication ticket will be described with reference to FIG. 3. FIG. 3 is an explanatory view showing the contents of the access authentication information and the authentication ticket. As shown in FIG. 3, access authentication information 2042 includes usage condition of the ticket, IC card write data, comparison data with IC read data, and the like. The usage condition of the ticket includes information on the process to use, connection path of the client applicant, ID of the ticket, valid period start date and time of the ticket, valid period end date and time of the ticket, usable number of times of the ticket, IC card solid information, IC card type information, IC card issuer type information, client applicant ID, IC card correspondence terminal hardware ID, IC card correspondence terminal owner ID, and the like.

The usage condition of the ticket is information usable by the card issuing server 300. The "connection path of the client applicant" is information on the connection path in which the client applicant connects to the card issuing server 300. The "IC card solid information" is solid information for identifying the IC card of the IC card on which the card issuing server 300 executes card accessing. The "IC card write data" is data the card issuing server 300 writes on the IC chip 150. The "comparison data" is data for comparing with the data of the IC card read from the IC chip 150, and is data for judging whether or not to actually write the write data to the IC card according to the result of verifying the comparison data. The use of the comparison data will be hereinafter described in detail. The access authentication information 2042 is encrypted by the authentication private key or added with the electronic signature data, and an authentication ticket 2044 is created.

Returning to FIG. 2, the access status inquiring unit 206 has a function of inquiring the access status to the IC card with respect to the card issuing server 300. The access status is the result of the process performed on the IC card by the card issuing server 300. Thus, when the client applicant is not reliable, when the communication path between the client applicant and the service providing server 200 is not reliable, or the like, the service providing server 200 can grasp an accurate processing result on the client applicant.

The communication control unit 208 is a communication interface configured to include a communication device, or the like for connecting to the network such as Internet, and has a function of transmitting and receiving data with the information processing terminal 100 or the card issuing server 300 through the network. The communication control unit 208 includes an authentication information receiving unit 210, an authentication ticket transmitting unit 212, an access status receiving unit 214, and the like. The authentication information receiving unit 210 has a function of receiving access authentication information transmitted from the client applicant 104 of the information processing terminal 100, and providing the same to the authentication ticket creating unit 204.

The authentication ticket transmitting unit 212 has a function of transmitting the authentication ticket created by the authentication ticket creating unit 204 to the card issuing server 300 through the network. The access status receiving unit 214 has a function of receiving the access status to the IC card from the card issuing server 300, and providing the same to the access status inquiring unit 206. The function configuration of the service providing server 200 has been described above.

The function configuration of the card issuing server 300 will now be described. The card issuing server 300 includes a communication control unit 302, a public key acquiring unit 304, an authentication ticket verifying unit 306, a verification result notifying unit 308, an authentication information verifying unit 310, an access status notifying unit 318, and the like. The communication control unit 302 is a communication interface configured to include a communication device, or the like for connecting to the network such as Internet, and has a function of transmitting and receiving data with the information processing terminal 100 or the service providing server 200 through the network.

The communication control unit 302 includes an authentication ticket receiving unit 312, a connection information transmitting unit 314, an IC card accessing unit 316, an access authentication information transmitting unit 320, and the like. The authentication ticket receiving unit 312 has a function of receiving the authentication ticket created by the service providing server 200, and providing the same to the authentication ticket verifying unit 306. The connection information transmitting unit 314 has a function of transmitting the connection information to the client applicant 104 of the information processing terminal 100 along with the notification of the verification result by the verification result notifying unit 308. The IC card accessing unit 316 has a function of accessing the IC chip 150 of the information processing terminal 100, performing read or write of the IC card information etc. of the IC chip 150, and providing the information of the IC card to the authentication information verifying unit 310. The access authentication information transmitting unit 320 has a function of notifying the access status to the IC chip 150 and transmitting the access authentication information written on the IC chip 150 to the service providing server 200 in response to the request of the service providing server 200.

The public key acquiring unit 304 has a function of acquiring a public key for authentication registered in the certificate authority 500 by the service providing server 200, and providing the same to the authentication ticket verifying unit 306. The authentication ticket verifying unit 306 verifies the legitimacy of the transmitted authentication ticket by decrypting the authentication ticket provided by the authentication ticket receiving unit 312 using the public key for authentication provided by the public key acquiring unit 304, or by verifying the added electronic signature.

The authentication ticket verifying unit 306 performs verification on the access authentication information of the authentication ticket. For instance, whether or not a valid period of the authentication ticket is appropriate, or whether the usable number of times of the authentication ticket has exceeded the number of times the authentication ticket is actually used is verified. Whether the executable process is appropriately selected is verified for every chip from the IC card type information of the ticket. If error occurs from when the write etc. to the IC card stored in the IC chip 150 is started between the client applicant and the card issuing server 300, it is difficult to understand the cause of error in the service providing server 200 as communication disconnection etc. occurs. Whether or not the executable process is appropriately selected can be verified for every chip as described above, and error can be detected at an earlier stage.

When limiting the processes of registration and deletion of the application, write or read of data, or the like for every IC chip issuer, whether the executable process is appropriately selected is verified for every IC chip issuer from the IC card issuer type information of the authentication ticket. Similar to the verification by the IC card type information, the error can be detected at an earlier stage by performing verification using the IC card issuer type information. The authentication ticket verifying unit 306 provides the verification result of the authentication ticket to the verification result notifying unit 308.

The verification result notifying unit 308 has a function of notifying the verification result of the authentication ticket provided by the authentication ticket verifying unit 306 to the service providing server 200. The verification result notifying unit 308 provides the connection information for the information processing terminal 100 to connect to the card issuing server 300 to the connection information transmitting unit 314 along with the verification result of the authentication ticket.

Figure 4:
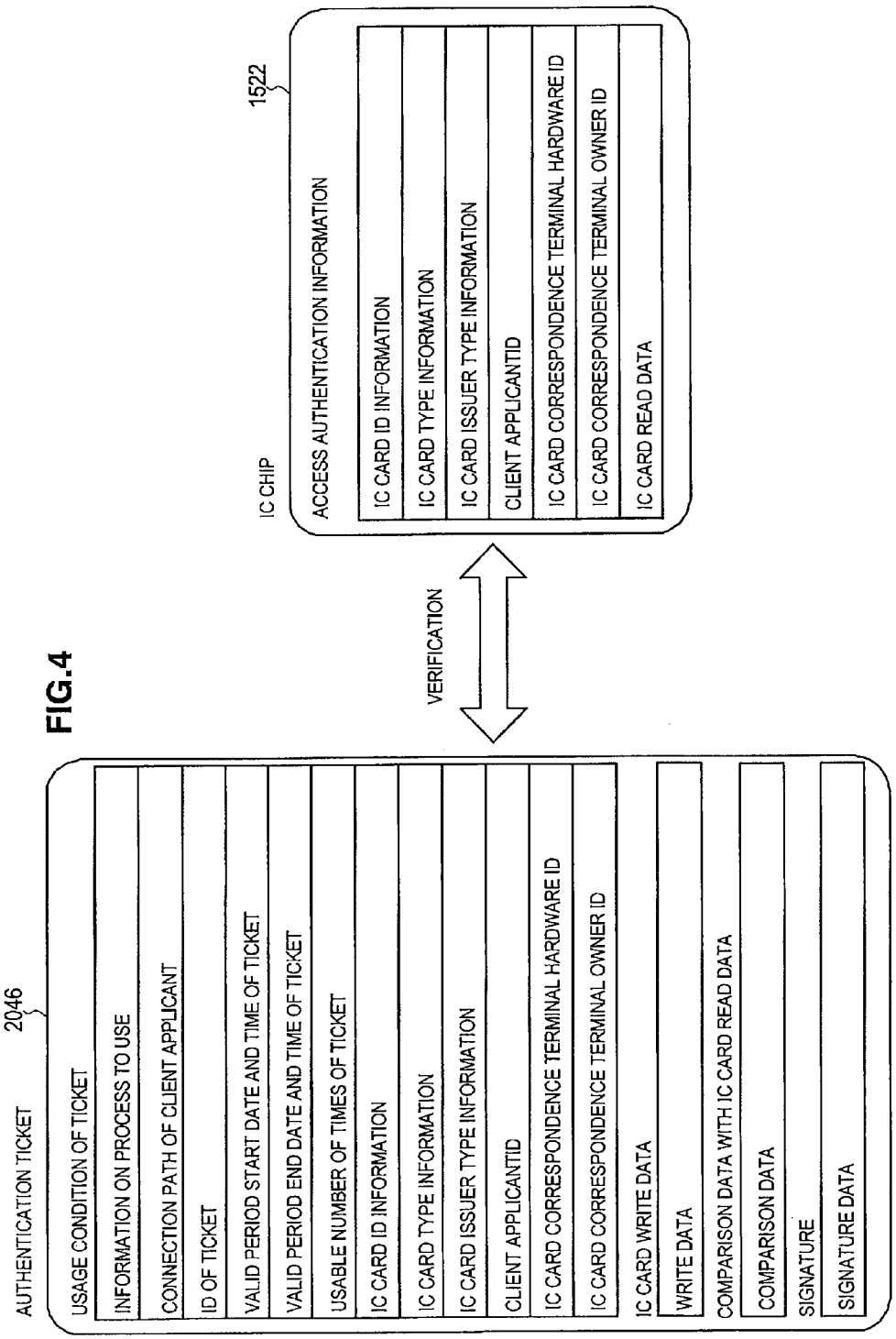
FIG. 4 is an explanatory view showing contents of authentication ticket and access authentication information stored in the IC chip according to the embodiment.

The authentication information verifying unit 310 has a function of comparing and verifying the access authentication information verified by the authentication ticket verifying unit 306, and the access authentication information stored in the IC chip acquired by the IC card accessing unit 316 accessing the IC chip 150. The verification of the IC card by the authentication information verifying unit 310 will be described with reference to FIG. 4. FIG. 4 is an explanatory view showing content of authentication ticket 2046 and access authentication information 1522 stored in the IC chip 150. The authentication information verifying unit 310 performs check of connection path, check of IC card individual information, check of comparison data with the data read from the IC card, and the like.

In the check of the connection path, whether the information processing terminal 100 is connected to the card issuing server 300 according to the connection path to the card issuing server 300 contained in the access authentication information of the authentication ticket is verified. This checking does not check only the connection path, but also the connection line, protocol, or the like.

In the check of the individual information of the IC card, whether the IC card solid information of the IC card, the IC card type information, the IC card issuer type information, the client applicant ID, the IC card correspondence hardware ID, and the IC card correspondence terminal owner ID contained in the access authentication information of the authentication ticket, and the access authentication information stored in the IC card match is verified. A process on only the specific IC card correspondence terminal or the IC card can be executed by such verification.

Figure 5:
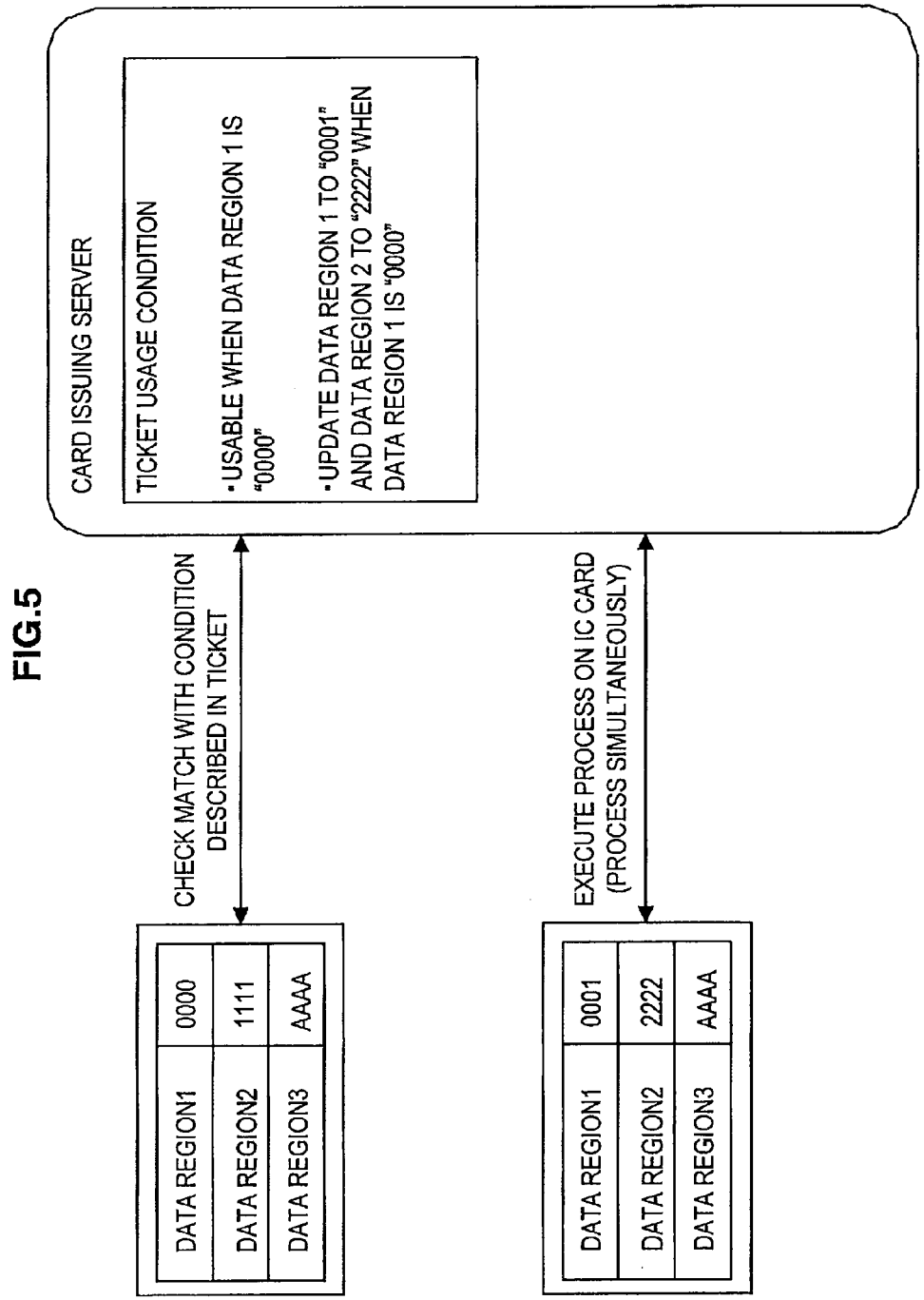
FIG. 5 is an explanatory view describing the usage example of the comparison data according to the embodiment.
Figure 6:
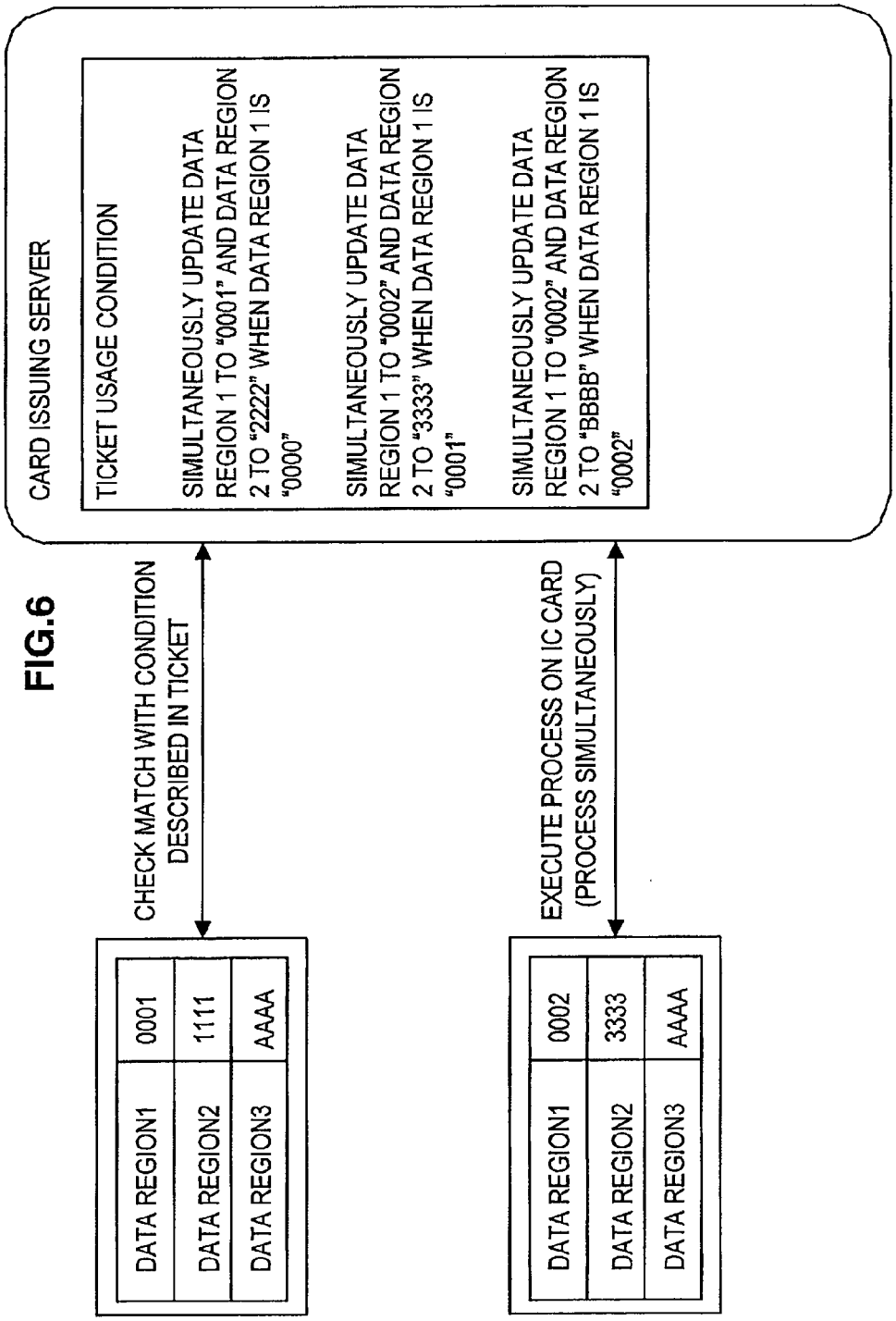
FIG. 6 is an explanatory view describing the usage example of the comparison data according to the embodiment.

In the check of the comparison data with the data read from the IC card, whether the comparison data contained in the access authentication information of the authentication ticket and the data actually acquired from the IC card match is verified. A replay attempt or the like of when the authentication ticket is stolen can be prevented by comparing and verifying the data of a specific region on the IC card. The write data value to the IC card may be dynamically changed according to the value read from the IC card. The usage example of the comparison data will be described in detail with reference to FIGS. 5 and 6. FIGS. 5 and 6 are explanatory views describing the usage example of the comparison data.

As shown in FIG. 5, the authentication information verifying unit 310 of the card issuing server 300 executes processes on the IC card after checking the match with the usage condition described in the authentication ticket. For instance, a case where the usage condition of the authentication ticket is usable only when the data region 1 of the IC card is "0000" will be described. As shown in FIG. 5, the data can be written if the data region of the IC card is "0000". If the usage condition of the authentication ticket includes simultaneously updating the data region 1 to "0001" and the data region 2 to "2222" when the data region 1 is "0000", the data region 1 of the IC card is updated to "0001" and the data region 2 is updated to "2222".

A case of dynamically updating the data according to the described condition of the authentication ticket is also considered. For instance, if the usage condition of the authentication ticket includes simultaneously updating the data region 1 to "0001" and the data region 2 to "2222" when the data region 1 is "0000", the data region 1 is updated to "0001" and the data region 2 is updated to "2222" when the data region 1 of the IC card is "0000".

Similarly, if the usage condition of the authentication ticket includes simultaneously updating the data region 1 to "0002" and the data region 2 to "3333" when the data region 1 is "0001", the data region 1 is updated "0002" and the data region 2 is updated to "3333" when the data region 1 of the IC card is "0001". Furthermore, if the usage condition of the authentication ticket includes simultaneously updating the data region 1 to "0002" and the data region 3 to "BBBB" when the data region 1 is "0002", the data region 1 is updated "0002" and the data region 3 is updated to "BBBB" when the data region 1 of the IC card is "0002". FIG. 6 is an explanatory view describing the update of the data region when a plurality of usage conditions of the authentication ticket exists. As shown in FIG. 6, since the data region 1 of the IC card is "0001", the data is updated based on the ticket usage condition of "when data region 1 is "0001". Specifically, the data region 1 is updated "0002" and the data region 2 is simultaneously updated to "3333" when the data region 1 of the ticket usage condition is "0001", and thus the data region 1 is updated "0002" and the data region 2 is simultaneously updated to "3333", as shown in FIG. 6. The above is the explanation on the usage example of the comparison data.

Returning to FIG. 2, the access status notifying unit 318 has a function of notifying the access status to the IC chip 150 in response to the request of the service providing server 200. For instance, if an inquiry of the access status is made by the service providing server 200 before accessing the IC card, whether or not communication with the IC card is started can be notified. Furthermore, if an inquiry of the access status is made by the service providing server 200 during the execution of a process on the IC card after accessing the IC card, the processing status with the IC card can be notified. Moreover, the processing result of the process performed with the IC card can be notified when the process on the IC card is terminated. Thus, the service providing server 200 can grasp an accurate processing result on the client applicant when the client applicant is not reliable, or the communication path between the client applicant and the service providing server 200 is not reliable.

The access authentication information transmitting unit 320 has a function of transmitting the access authentication information stored in the IC chip to the service providing server 200 in response to the request of the service providing server. The service providing server 200 then can acquire the data read from the IC card at the same time as inquiring the access status, and an efficient sequence can be realized. The function configuration of the card issuing server 300 has been described above.

Figure 7:
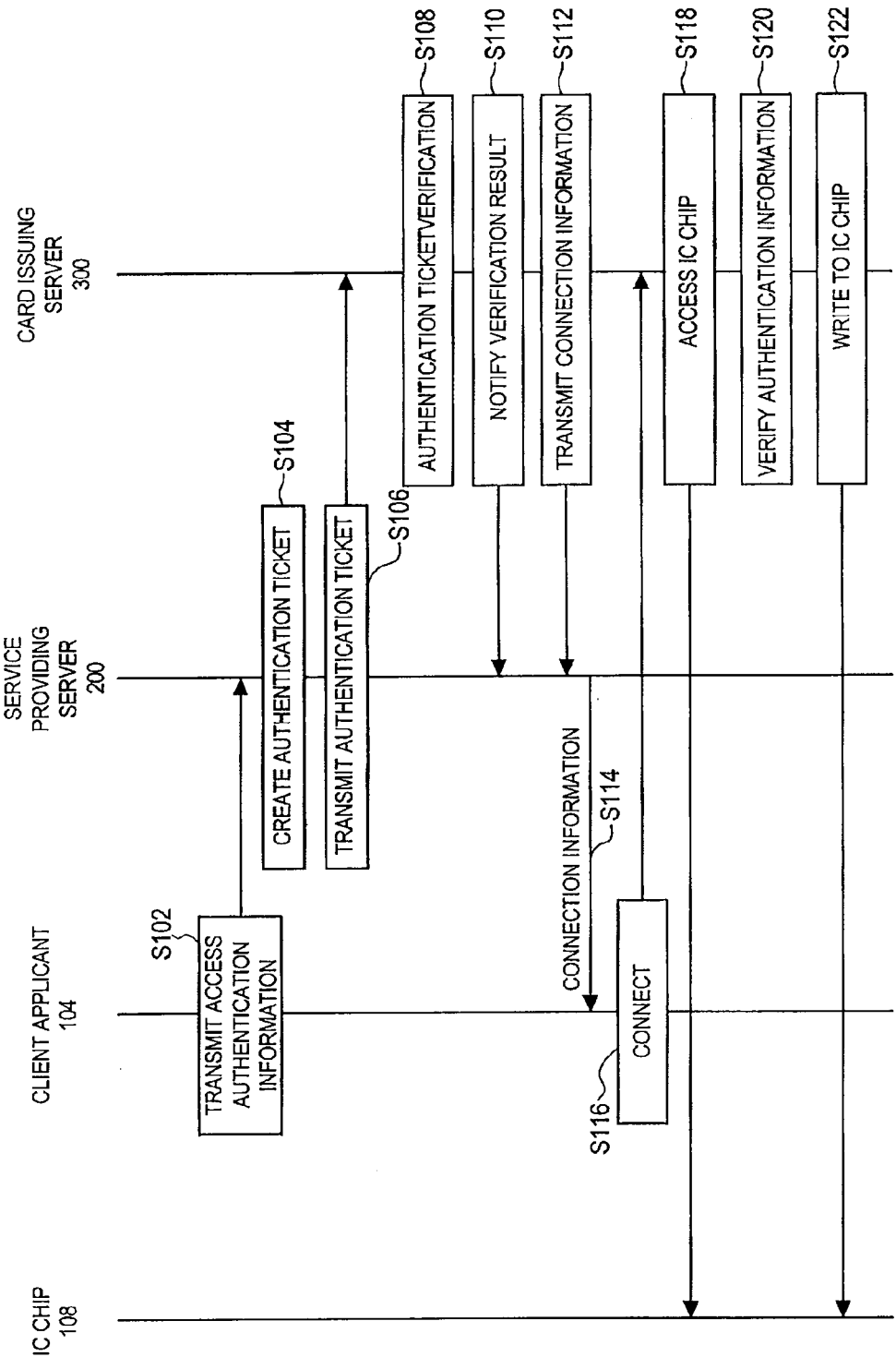
FIG. 7 is a timing chart showing a flow of a card issuing method according to the embodiment.

The card issuing method executed in the card issuing system 10 will now be described. FIG. 7 shows a timing chart showing a flow of the card issuing method executed in the card issuing system 10. As shown in FIG. 7, the client applicant 104 first transmits the access authentication information to the service providing server 200 (S102). The access authentication information transmitted in step S102 may be only the IC card individual information of the IC card, or may be part of the access authentication information for the service providing server 200 to create the authentication ticket.

The service providing server 200 transmitted with the access authentication information from the client applicant 104 in step S102 encrypts the access authentication information or adds an electronic signature to create the authentication ticket (S104). The service providing server 200 transmits authentication ticket created in step S104 to the card issuing server 300 (S106).

The card issuing server 300 transmitted with the authentication ticket from the service providing server 200 in step S106 verifies the authentication ticket (S108). In the verification of the authentication ticket in step S108, whether the authentication ticket can be correctly decrypted, whether a correct electronic signature is added, check of the usage condition contained in the access authentication information, and the like are carried out. The verification of the authentication ticket in step S108 will be hereinafter described in detail.

The verification result of the authentication ticket verified in step S108 is transmitted to the service providing server 200 (S110). The card issuing server 300 transmits to the service providing server 200 the connection information for the client applicant 104 to connect with the card issuing server 300 (S112). The service providing server 200 transmitted with the connection information from the card issuing server 300 in step S112 transmits the relevant connection information to the client applicant 104 (S114).

The client applicant 104 transmitted with the connection information to the card issuing server 300 from the service providing server 200 in step S114 connects to the card issuing server 300 based on the relevant connection information (S116). The card issuing server 300 connected to the client applicant 104 in step S116 checks the legitimacy of the client applicant 104 based on the connection status from the client applicant 104 and the individual information of the client applicant 104, and then accesses the IC chip 150 (S118).

The individual information of the IC card of the IC chip 150 acquired by accessing the IC chip 150 in step S118 and the access authentication information of the authentication ticket are compared and verified (S120). The verification of the authentication information in step S120 will be hereinafter described in detail. When the legitimacy of the IC card is confirmed as a result of the verification in step S120, write of the card information of the IC card to the IC chip 150, and update of the card information are carried out (S122). The card issuing method executed in the card issuing system 10 is as described above.

Figure 8:
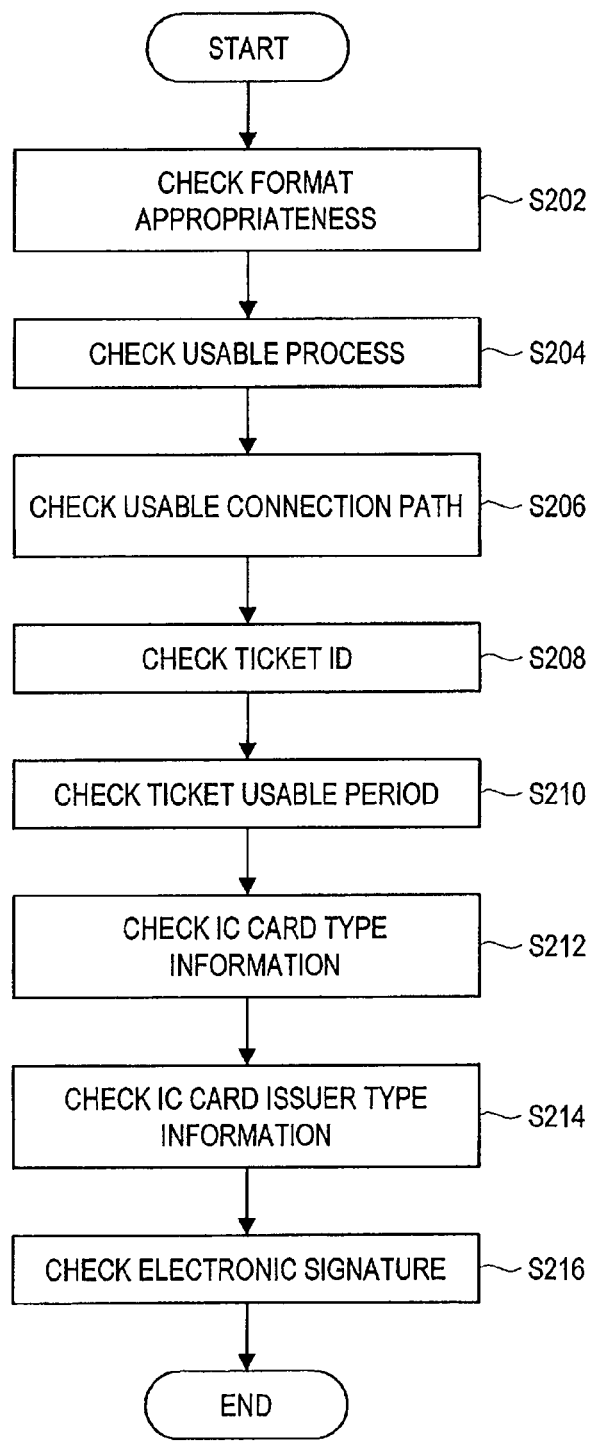
FIG. 8 is an explanatory view describing a verification process of an authentication ticket according to the embodiment.

The verification of the authentication ticket will now be described in detail based on FIG. 8. FIG. 8 is an explanatory view describing the verification process of the authentication ticket. As shown in FIG. 8, whether or not the format of the authentication ticket is appropriate is first checked (S202). Next, whether or not the process usable in the card issuing server 300 is specified is checked (S204). Then, whether or not the connection path usable in the card issuing server 300 is specified is checked (S206).

When the authentication ticket ID same as that used in the past is not specified or the usable number of times is specified, whether within the range of the usable number of times of the authentication ticket is checked (S208). Whether the usable period of the authentication ticket is specified is checked, and when the usable period is specified, whether within the usable period is checked (S210). Whether the process executable with the IC card type information is appropriately selected for the information of the process to use is checked (S212). Whether the process executable with the IC card issuer type information is appropriately selected for the information of the process to use is checked (S214). Whether the correct electronic signature is added, or whether decryption can be correctly carried out when the authentication ticket is encrypted is checked (S216). The verification process of the authentication ticket may simultaneously perform all the processes, and the order of processes is arbitrary. The verification process of the authentication ticket is as described above.

Figure 9:
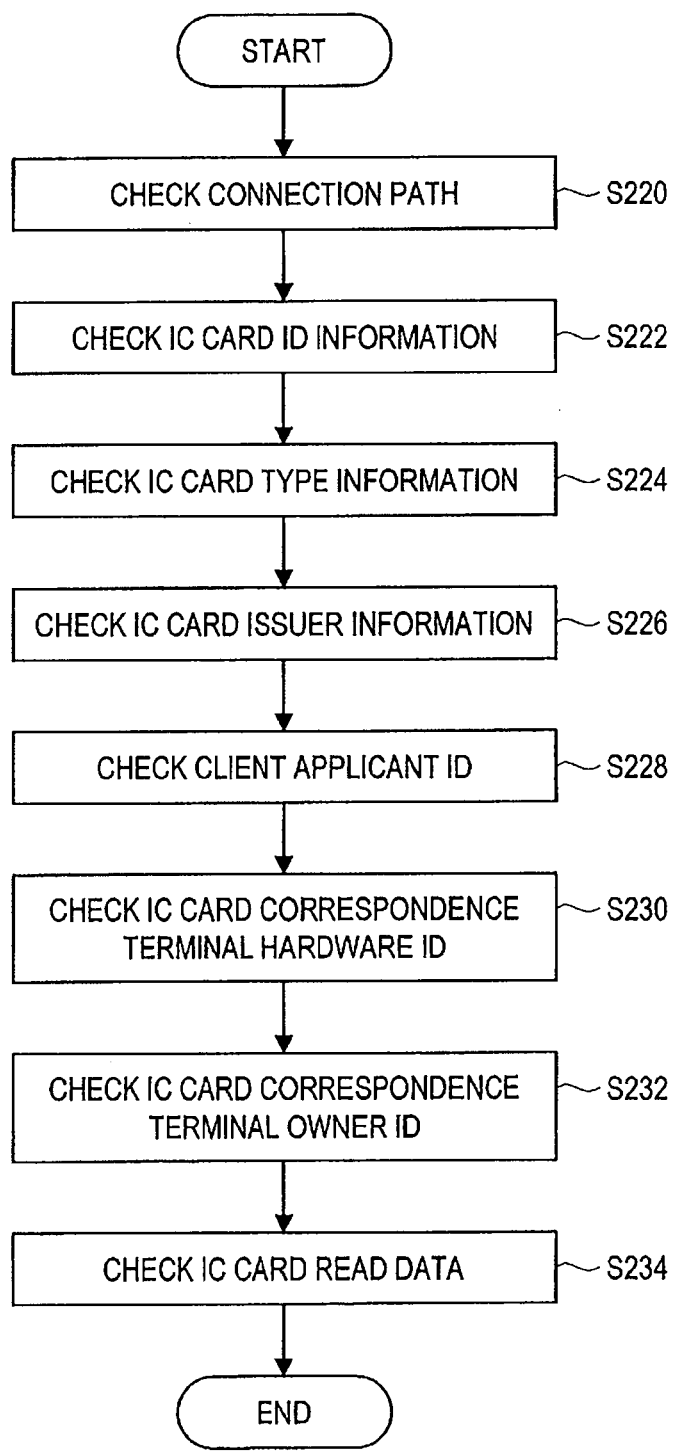
FIG. 9 is an explanatory view describing a verification process of the authentication information of the IC card according to the embodiment.

The verification of the authentication information of the IC card will now be described based on FIG. 9. FIG. 9 is an explanatory view describing the verification process of the authentication information of the IC card. As shown in FIG. 9, whether or not the connection path is the same as the specified connection path is checked (S220). In step S220, in addition to the check of the connection path, the connection line, as well as the state of the protocol, the connection I/F of the chip, the key of the chip, and the like may be checked. Then, whether the IC card solid information is the same as the IC card solid information of the authentication ticket is checked (S222).

Whether the IC card type information is the same as the IC card type information of the authentication ticket is checked (S224). Furthermore, whether the IC card issuer information is the same as the IC card issuer information of the authentication ticket is checked (S226). Then, whether the client applicant ID is the same as the client applicant ID of the authentication ticket is checked (S228). Whether the IC card correspondence terminal hardware ID is the same as the IC card correspondence terminal hardware ID of the authentication ticket is checked (S230). Whether the IC card correspondence terminal owner ID is the same as the IC card correspondence terminal owner ID of the authentication ticket is checked (S232). Whether the IC card read data is the same as the read data specified in the authentication ticket is checked (S234). The verification process of the authentication information of the IC card may simultaneously perform all the processes, and the order of processes is arbitrary. The verification process of the authentication information of the IC card is as described above.

Figure 10:
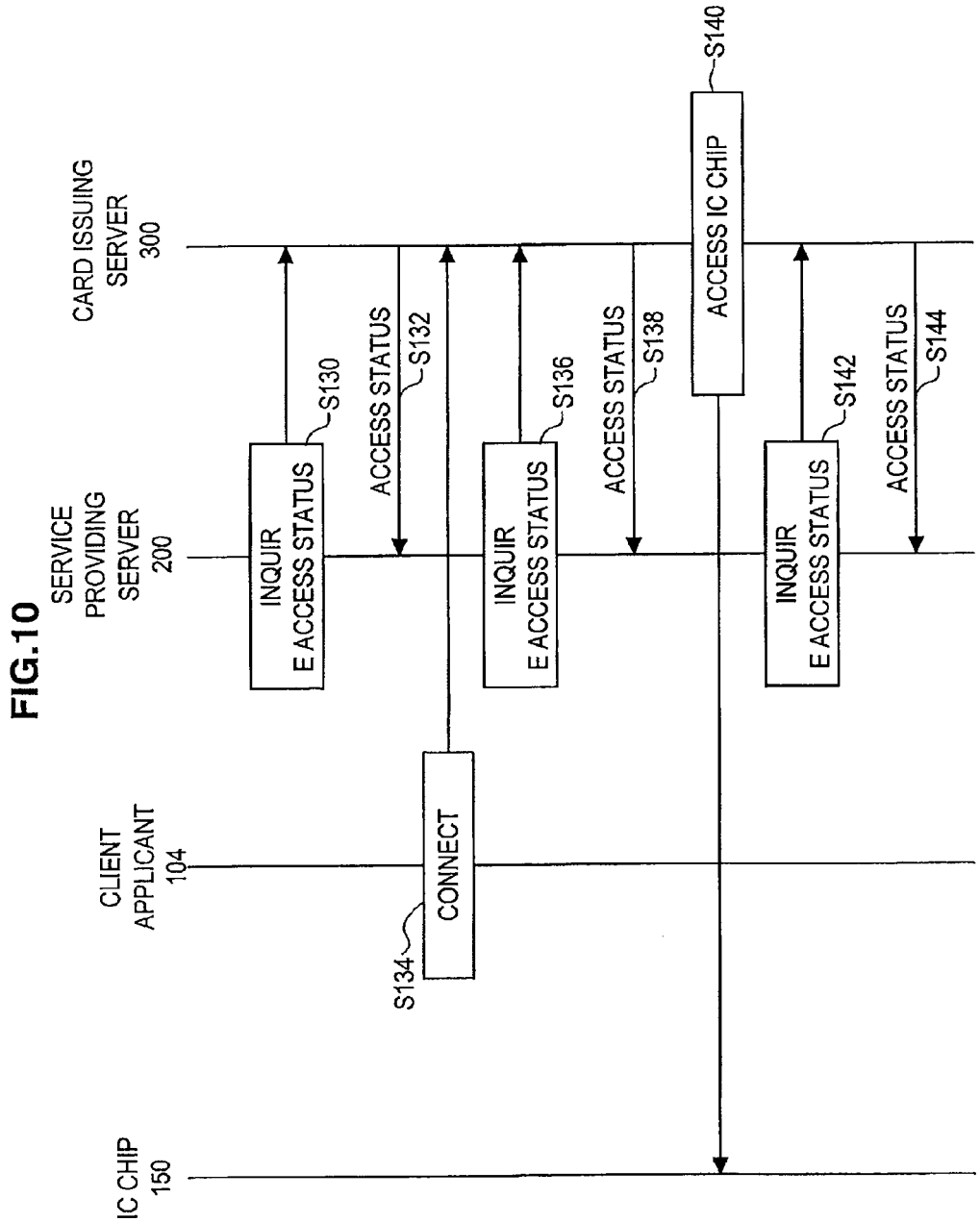
FIG. 10 is a timing chart showing an access information inquiring process according to the embodiment.

An access information inquiring process in the card issuing system 10 will now be described based on FIG. 10. FIG. 10 shows a timing chart showing the access information inquiring process. As shown in FIG. 10, the service providing server 200 inquires the access status to the IC card with respect to the card issuing server 300 (S130). The card issuing server 300 inquired of the access status from the service providing server 200 in step S130 notifies the access status to the IC card to the service providing server 200 (S132). In step S132, the card issuing server 300 is not connected even from the client applicant 104, and thus notifies non-connection with the information processing terminal 100.

The connection from the client applicant 104 to the card issuing server 300 is made (S134). After the connection in step S134, the service providing server 200 inquires the access status (S136), and the card issuing server 300 notifies the access status (S137). In step S137, the card issuing server 300 notifies that connection from the client applicant 104 has been made.

Access from the card issuing server 300 to the IC chip is made (S140). After the access in step S140, the service providing server 200 inquires the access status (S142), and the card issuing server 300 notifies the access status (S144). In step S144, the card issuing server 300 notifies the access status such as the access result to the IC chip, to where the process is performed, the execution result of the process, and the like. The inquiry of the access status can be executed even during access to the IC chip.

The service providing server 200 may use the one-time ID, and the like, to check the processing state of the client applicant 104 to the card issuing server. The processing state such as whether the client applicant 104 is connected to the card issuing server 300, whether the client applicant 104 is connected to the card issuing server 300 but error occurred, whether the client applicant 104 is connected to the card issuing server 300 and the process is normally completed, and the like then can be grasped. The access information inquiring process in the card issuing system 10 is as described above.

The card issuing system 10 according to the first embodiment has been described above. According to the card issuing system 10, the service providing server 200 encrypts the access authentication information for authenticating the access by the information processing terminal to create the authentication ticket, and the authentication ticket is transmitted to the card issuing server 300. The card issuing server 300 verifies the authentication ticket, and notifies the verification result to the service providing server, and transmits the connection information for connecting to the card issuing server 300. The information processing terminal 100 transmitted with the connection information through the service providing server 200 connects to the card issuing server 300, so that the card issuing server 300 can access the IC chip 150 of the information processing terminal 100.

The authentication ticket transmitted from the service providing server 200 contains the IC card solid information and the like, and thus the IC chip can be verified in advance to detect the process to which the IC card does not correspond at an early stage before accessing the IC card, whereby unauthorized access can be efficiently prevented.

(Second Embodiment)

A brief overview of a card issuing system according to a second embodiment of the present invention will now be described. A card issuing system 10' according to the present embodiment includes an information processing terminal 100', a service providing server 200', and a card issuing server 300'. The configuration of the card issuing system 10' is substantially the same as the configuration of the card issuing system 10 according to the first embodiment, and thus detailed description will be omitted. The present embodiment differs from the first embodiment in that the information processing terminal 100' is a reliable client. When referring to having the information processing terminal 100' as a reliable client, it is not a terminal capable of mounting application that can be easily packet analyzed and the like, but an incorporating terminal such as a portable terminal, or when the content of the authentication ticket can be referenced in the information processing terminal 100' without arising any issue.

In this case, the authentication ticket created by the service providing server 200' is transmitted to the client applicant of the information processing terminal 100', and the client applicant connects to the card issuing server 300' and transmits the authentication ticket, to thereby execute the authentication process of the IC card. The communication between the service providing server 200' and the card issuing server 300 then can be reduced, and the building man-hour of the service providing server 200 can be reduced. In the present embodiment, the authentication ticket is created in the service providing server 200', but is not limited to such example. For instance, the information processing terminal 100' may have a function similar to the service providing server 200'. Specifically, the information processing terminal 100' may hold the private key for creating the authentication ticket, and create the authentication ticket. The brief overview of the card issuing system 10' according to the present embodiment is as described above.

Figure 11:
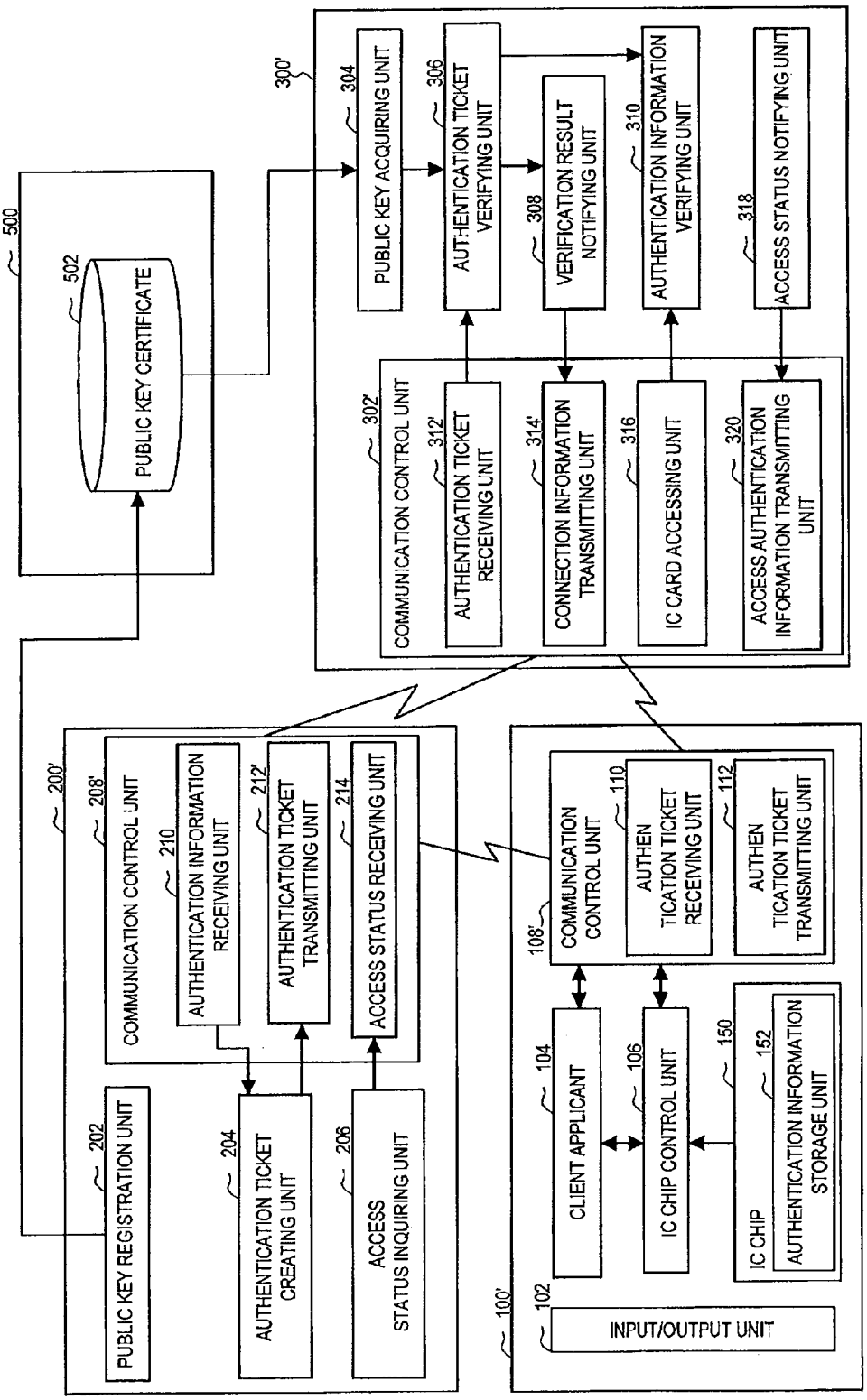
FIG. 11 is a block diagram showing function configurations of an information processing terminal, a service providing server, and a card issuing server according to a second embodiment of the present invention.

The function configuration of the information processing terminal 100', the service providing server 200', and the card issuing server 300' of the card issuing system 10' will be described below based on FIG. 11. FIG. 11 is a block diagram showing the function configuration of the information processing terminal 100', the service providing server 200', and the card issuing server 300'. The information processing terminal 100' has a function substantially the same as the information processing terminal 100 of the first embodiment, and thus the detailed description will be omitted. As described above, the information processing terminal 100' is a reliable client. A particularly different point from the information processing terminal of the first embodiment is that the authentication ticket created by the service providing server 200' is received by the authentication ticket receiving unit 110, and the authentication ticket transmitting unit 112 transmits the relevant authentication ticket to the card issuing server 300'.

The service providing server 200' has a function substantially similar to the service providing server 200 of the first embodiment, and thus detailed description will be omitted. The service providing server 200' particularly differs from the service providing server 200 of the first embodiment in that the authentication ticket transmitting unit 212' provided with the authentication ticket created by the authentication ticket creating unit 204 transmits the authentication ticket to the client applicant 104 of the information processing terminal 100' instead of the card issuing system 300'. The authentication ticket transmitted to the client applicant 104 is transmitted from the client applicant 104 to the card issuing server 300'. The communication between the service providing server 200' and the card issuing server 300' then can be reduced, and the building man-hour of the service providing server 200' can be reduced.

The card issuing server 300' has substantially the same function as the card issuing server 300 of the first embodiment, and thus detailed description will be omitted. The card issuing server 300' particularly differs from the card issuing server 300 of the first embodiment in that the authentication ticket receiving unit 312' receives the authentication ticket transmitted from the information processing terminal 100', and provides the authentication ticket to the authentication ticket verifying unit 306. The verification result of the verification result notifying unit 308 and the connection information transmitted at the same time as the verification result are transmitted to the client applicant 104 of the information processing terminal 100' by the connection information transmitting unit 314'. The verification result and the connection information are transmitted to the client applicant 104 through the service providing server 200 in the first embodiment, but are directly transmitted to the client applicant 104 in the present embodiment. Thus, the communication between the service providing server 200' and the card issuing server 300' can be reduced. The function configuration of each device related to the card issuing system 20' is as described above.

Figure 12:
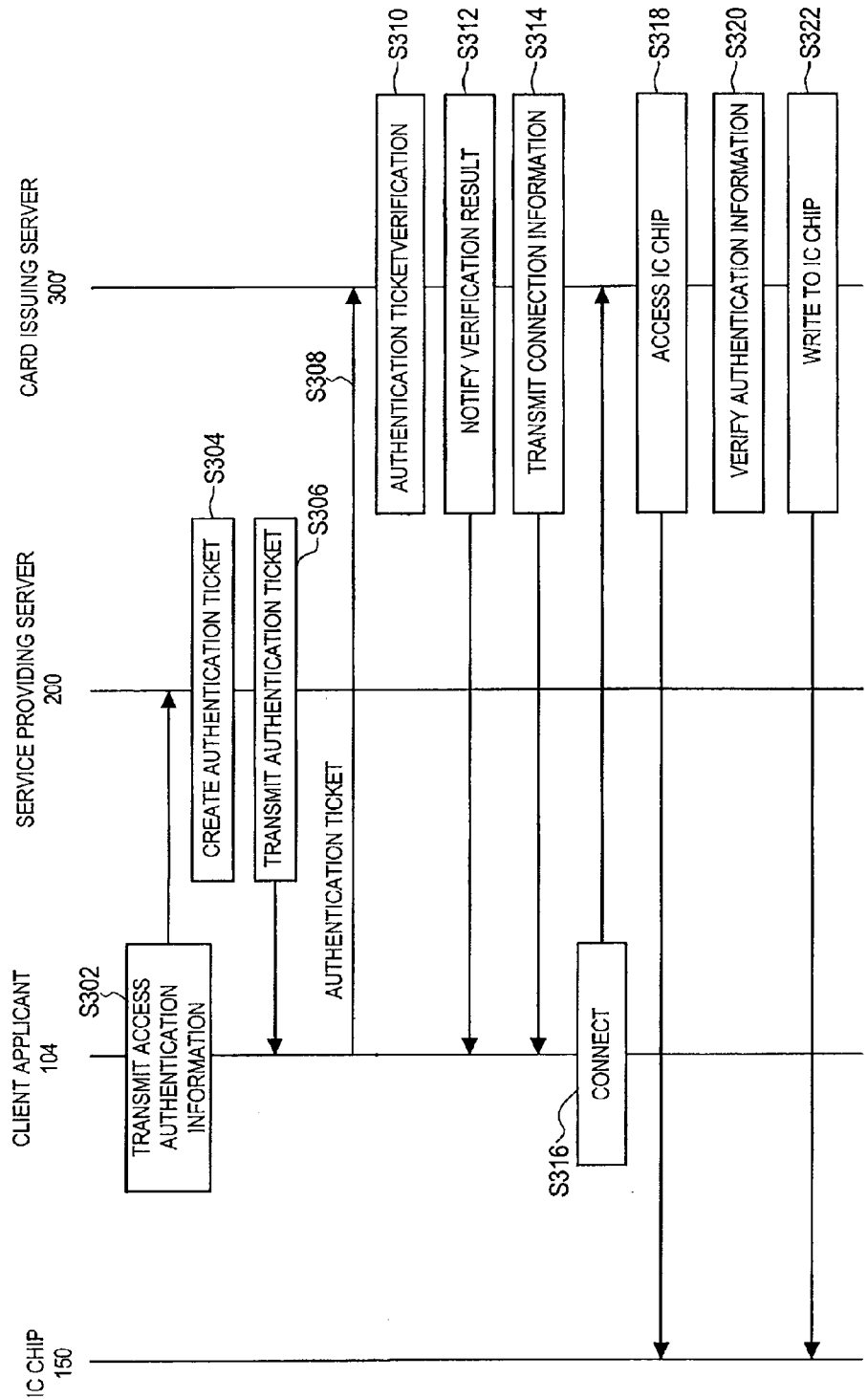
FIG. 12 is a timing chart showing a flow of a card issuing method according to the embodiment.

The card issuing method executed in the card issuing system 10' will now be described. In the card issuing method according to the present embodiment, the detailed description on the processes similar to the first embodiment will be omitted. FIG. 12 shows a timing chart showing a flow of the card issuing method executed in the card issuing system 10'. As shown in FIG. 12, the client applicant 104 first transmits the access authentication information to the service providing server 200' (S302). The service providing server 200' transmitted with the access authentication information from the client applicant 104 in step S302 encrypts the access authentication information or adds an electronic signature to create the authentication ticket (S304). The authentication ticket created in step S304 is transmitted to the client applicant 100' (S306).

The client applicant 104 transmitted with the authentication ticket by the service providing server 200' in step S306 transmits the authentication ticket to the card issuing server 300' (S308). The card issuing server 300' transmitted with the authentication ticket from the client applicant 104 in step S308 verifies the authentication ticket (S310). In the verification of the authentication ticket in step S310, whether the authentication ticket can be correctly decrypted, whether a correct electronic signature is added, check of the usage condition contained in the access authentication information, and the like are carried out, as described above.

The verification result of the authentication ticket verified in step S310 is transmitted to the client applicant 104 (S312). The card issuing server 300 transmits to the client applicant 104 the connection information for the client applicant 104 to connect with the card issuing server 300 (S314). The client applicant 104 transmitted with the connection information to the card issuing server 300' from the card issuing server 300' in step S314 connects to the card issuing server 300' based on the relevant connection information (S316). The card issuing server 300' connected to the client applicant 104 in step S316 checks the legitimacy of the client applicant 104 from the connection status from the client applicant 104 and the individual information of the client applicant 104, and then accesses the IC chip 150 (S318).

The individual information of the IC card of the IC chip 150 acquired by accessing the IC chip 150 in step S318 and the access authentication information of the authentication ticket are compared and verified (S320). When the legitimacy of the IC card is confirmed as a result of the verification in step S320, write of the card information of the IC card to the IC chip 150, and update of the card information are carried out (S322). The card issuing method executed in the card issuing system 10' is as described above.

The card issuing system 10' according to the second embodiment has been described above. According to the card issuing system 10', the authentication ticket created by the service providing server 200' is transmitted to the client applicant 104 of the information processing terminal 100', and the client applicant 104 connects with the card issuing server 300' and transmits the authentication ticket, whereby the authentication process of the IC card can be executed. The communication between the service providing server 200' and the card issuing server 300' then can be reduced, and the building man-hour of the service providing server 200' can be reduced.

(Third Embodiment)

Figure 13:
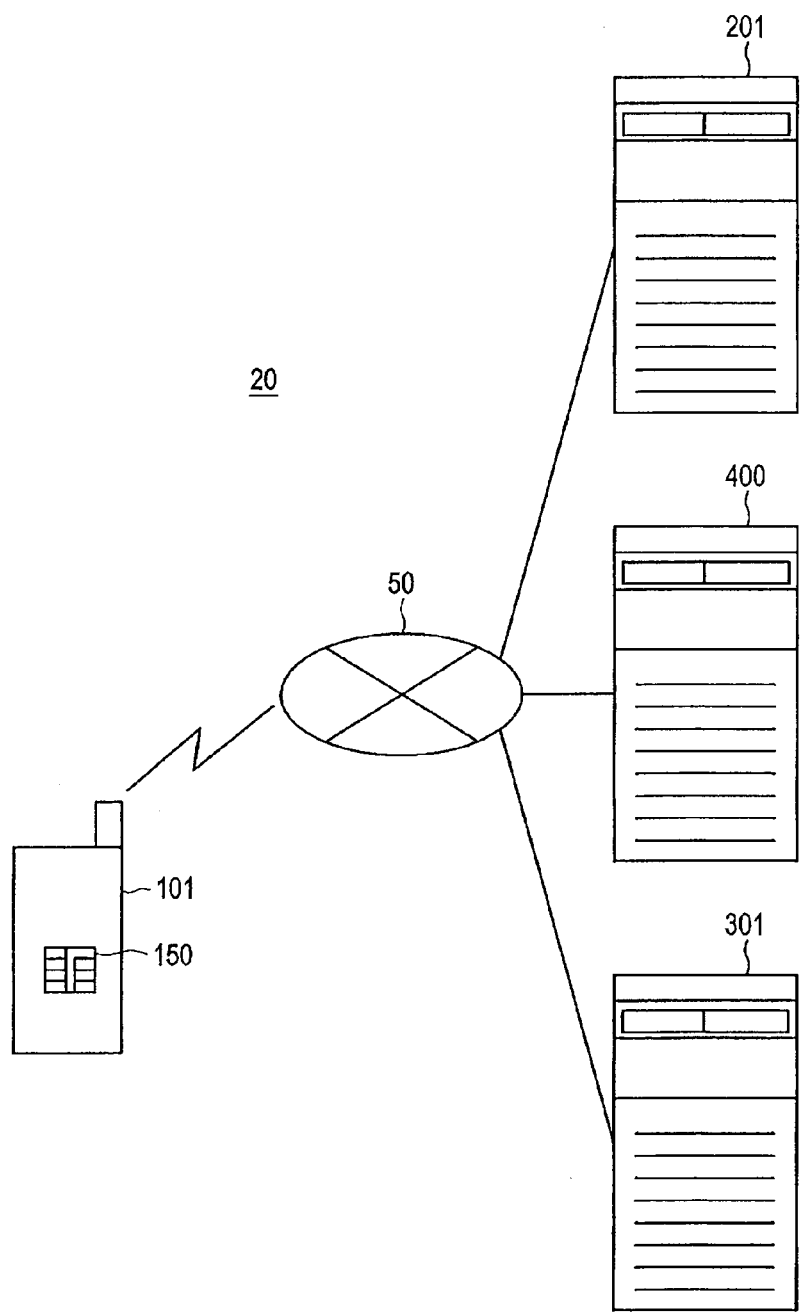
FIG. 13 is an explanatory view showing a configuration example of a card issuing system according to a third embodiment of the present invention.

A brief overview of a card issuing system according to a third embodiment of the present invention will now be described. FIG. 13 is an explanatory view showing a configuration example of a card issuing system 20 according to the present embodiment. As shown in FIG. 13, the card issuing system 20 includes an information processing terminal 101, a service providing server 201, a card issuing server 301, and a service acting server 400. In the card issuing system 20, the information processing terminal 101, the service providing server 201, the card issuing serve 301, and the service acting server 400 are connected by way of the network 50. The present embodiment greatly differs from the first embodiment and the second embodiment in that the service acting server 400 is arranged.

The service acting server 400 has a function of carrying out the processes of the card issuing server 301 and the information processing terminal 101 based on the request from the service providing server 201. In this case, an issue in that all the processes to be executed by the service providing server 201 is to be permitted to the service acting server 400 if the authentication ticket has a one-layer configuration as in the first embodiment or the second embodiment arises. An authentication license capable of executing only the process requested to the service acting server 400 by the service providing server 201 is created, and the authentication ticket is created based on the relevant license. Thus, when the service providing server 201 requests for an alternate processing to the service acting server 400, the executable process can be limited while maintaining security by having the authentication ticket as a multi-stage configuration.

In the present embodiment, the authentication license and the authentication ticket respectively is desirably encrypted or added with an electronic signature to have the authentication ticket as a multi-stage configuration. For instance, when using an electronic signature verification by an asymmetric key such as RSA, the service providing server 201, which creates the license, prepares an authentication key pair 1 (Pk1/Sk1), and the service acting server 400, which creates the authentication ticket, prepares an authentication key pair 2 (Pk2/Sk2). The card issuing server 301 is registered in advance with the authentication public key (Pk1), or the card issuing server 301 is desirably to acquire the authentication public key 1 (Pk1) from the certificate authority if the certificate authority is arranged.

A brief overview of the authentication of multi-stage configuration using the authentication key is as follows. The service providing server 201 creates authentication information including an authentication public key 2 (Pk2), which forms a pair with the authentication private key 2 (Sk2) of the service acting server 400, and creates the authentication license added with the electronic signature using the authentication private key 1 (Sk1). The details of the authentication license will be hereinafter specifically described. The service acting server 400 adds the individual information of the IC card to the authentication license transmitted from the service providing server 201, and creates the authentication ticket added with the electronic signature using the authentication private key 2 (Sk2).

The card issuing server 301 that received the authentication ticket created by the service acting server 400 verifies the electronic signature contained in the ticket using the authentication public key 1 (Pk1) acquired in advance, and checks the legitimacy of the authentication public key 2 (Pk2) contained in the license. After the legitimacy of the authentication public key 2 (Pk2) is confirmed, the electronic signature verification of the authentication ticket is performed using the authentication public key 2 (Pk2) to verify the legitimacy of the authentication ticket.

Therefore, according to the multi-stage configuration using different authentication keys for the authentication license and the authentication ticket, authentication is mutually possible and the process to be acted can be limited even when the service providing server 201 has the service acting server 400 and the like carry out the processes. In the present embodiment, the verification of the authentication ticket and the verification of the IC card other than that the authentication ticket has a multi-stage configuration are similar to the first embodiment and the second embodiment, and thus detailed description will be omitted. The brief overview of the card issuing system 20 is as described above.

Figure 14:
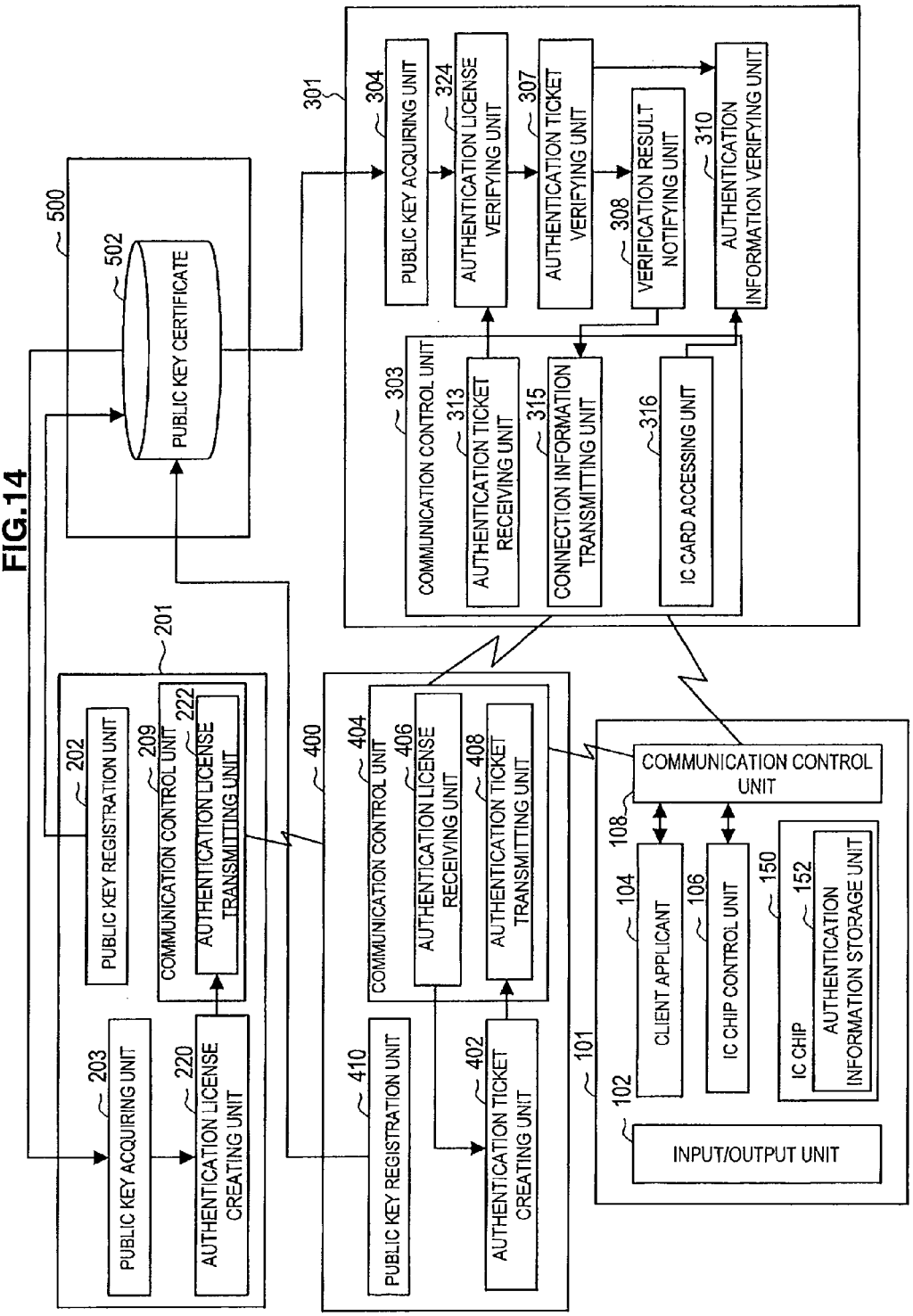
FIG. 14 is a block diagram showing a function configuration of the information processing terminal, the service providing server, and the card issuing server according to the embodiment.

The detailed configuration of the information processing terminal 101, the service providing server 201, the card issuing server 301, and the service acting server 400 of the card issuing system 20 will now be described. FIG. 14 is a block diagram showing a function configuration of the information processing terminal 101, the service providing server 201, the card issuing server 301, and the service acting server 400. The information processing terminal 101 has a function substantially similar to the information processing terminal 100 according to the first embodiment, and thus detailed description will be omitted. The information processing terminal 101 differs from the information processing terminal 100 of the first embodiment in that the individual information of the IC chip 150 is transmitted to the service acting server 400.

Figure 15:
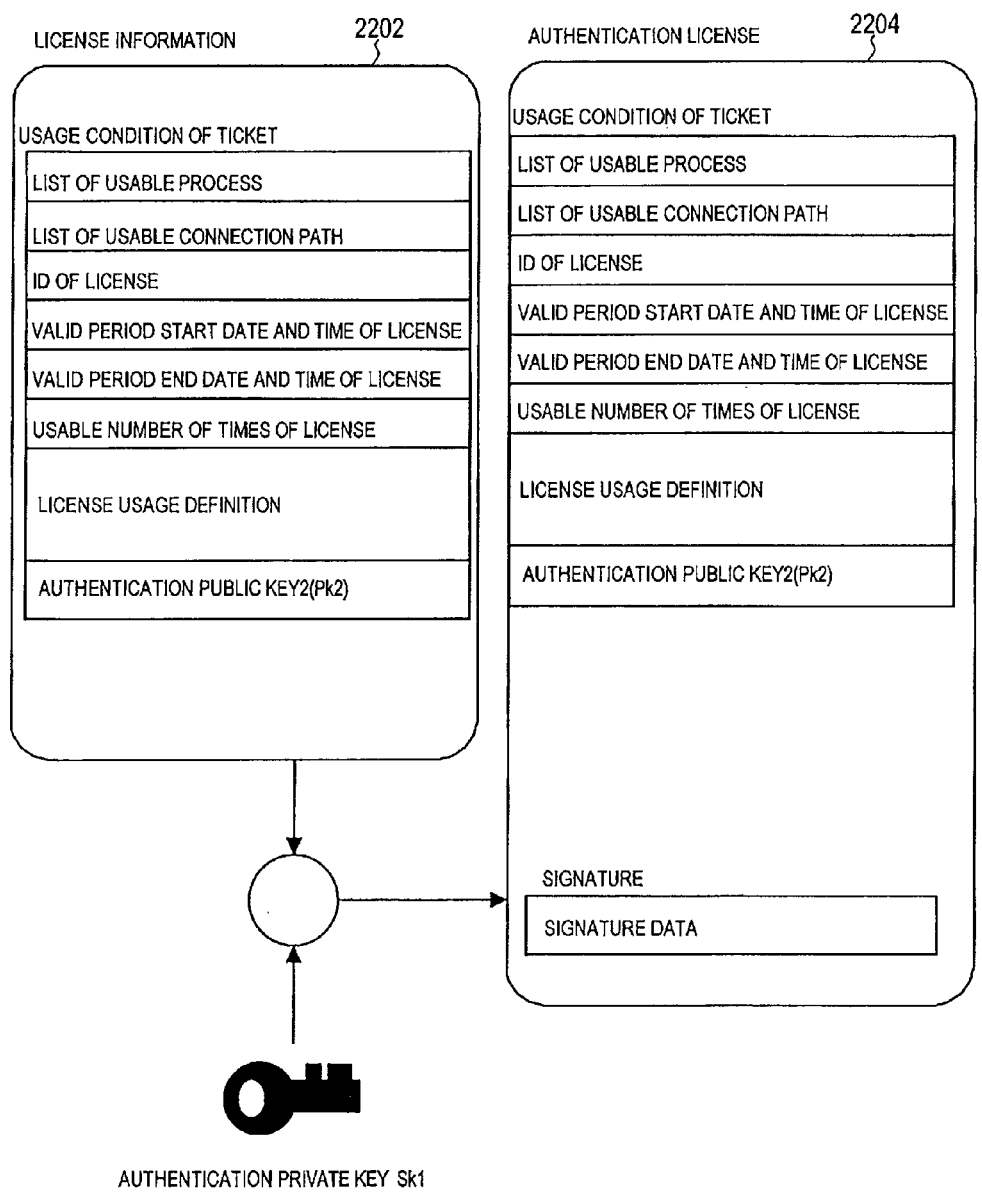
FIG. 15 is an explanatory view describing the contents of the license information and the authentication license according to the embodiment.

The service providing server 201 includes a public key registration unit 202, a public key acquiring unit 203, a communication control unit 209, and an authentication license creating unit 220. The public key registration unit 202 has a function of registering the authentication public key 1 (Pk1) of the authentication key pair 1 in the certificate authority 500 in advance. The public key acquiring unit 203 has a function of acquiring the authentication public key registered in the certificate authority 500 by the service acting server 400, and providing the relevant authentication public key to the authentication license creating unit 220. The authentication license creating unit 220 acquires the authentication public key (Pk2). The authentication license creating unit 220 has a function of encrypting the information of the service to license to the service acting server 400 and creating the authentication license. The information of the service (hereinafter referred to as license information) to license to the service acting server 400 and the authentication license will be discussed here based on FIG. 15. FIG. 15 is an explanatory view describing the contents of the license information 2202 and the authentication license 2204. As shown in FIG. 15, the license information 2202 includes usage conditions of the license, where the usage conditions of the license includes list of usable process, list of usable connection path, ID of license, valid period start date and time of license, valid period end date and time of license, usable number of times of license, license usage definition, authentication public key 2 (Pk2), and the like.

The license usage definition is defined with conditions such as whether or not the IC card solid information of the IC card to access in the card issuing server 301, the client applicant ID, the IC card correspondence terminal hardware ID, the IC card correspondence terminal owner ID, and challenge (one-time ID, password information, etc.) transmitted from the card issuing server 301 is desirably contained in the ticket information. The license information 2202 including the authentication public key 2 (Pk2) is added with the electronic signature using the authentication private key 1 (Sk1) to create the authentication license 2204. Returning to FIG. 14, the authentication license creating unit 220 provides the created authentication license to the authentication license transmitting unit 222.

The communication control unit 209 is a communication interface configured to include a communication device, or the like for connecting to the network such as the Internet, and has a function of transmitting and receiving data with the service acting server 400 through the network. The communication control unit 209 includes the authentication license transmitting unit 222, and the like. The authentication license transmitting unit 222 provided with the authentication license by the authentication license creating unit 220 transmits the relevant authentication license to the service acting server 400. In the present embodiment, the authentication license is transmitted to the service acting server 400 through the network, but is not limited to such example, and the authentication license may be transmitted to the service acting server 400 off-line.

Figure 16:
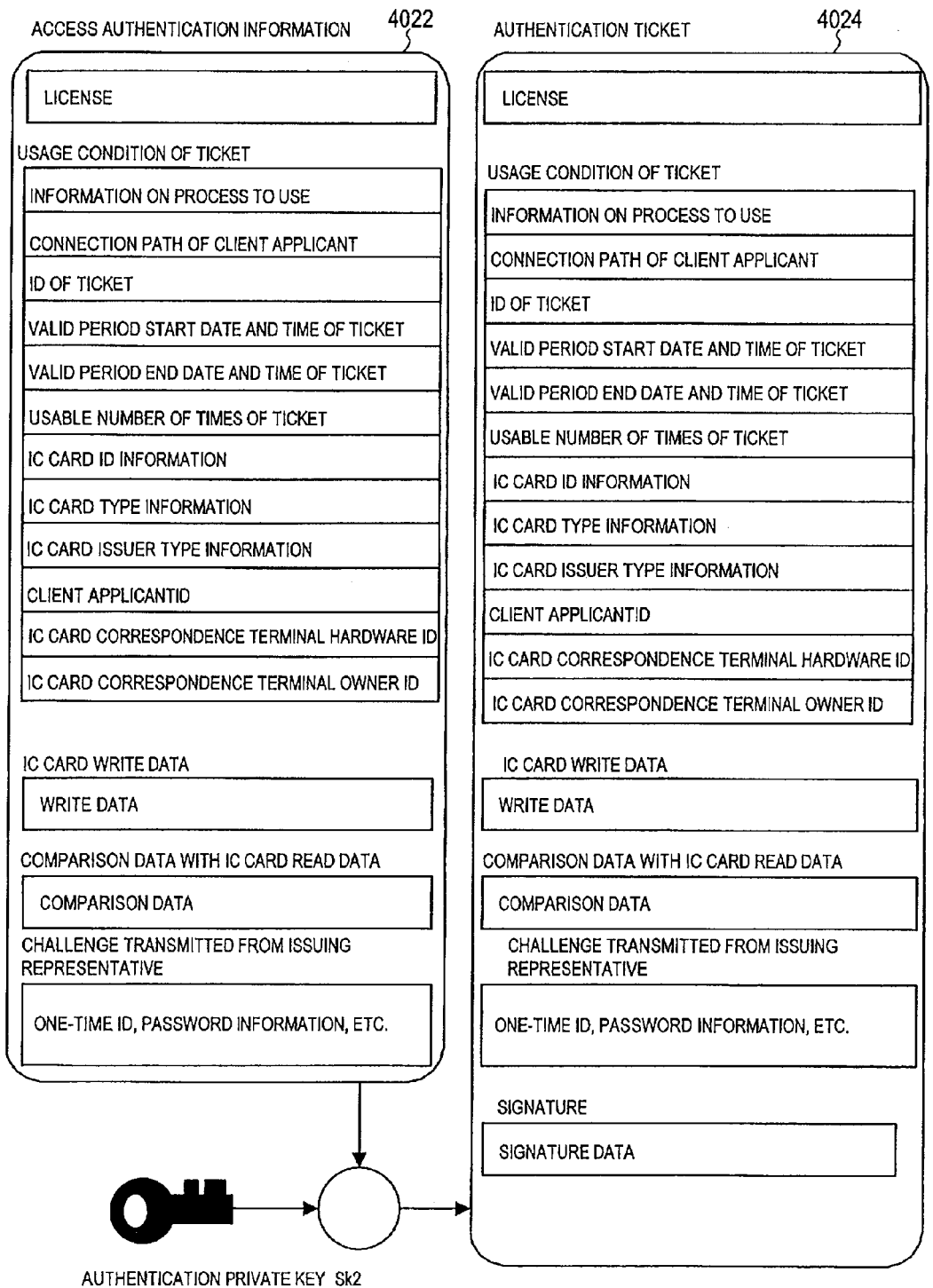
FIG. 16 is an explanatory view describing the contents of the access authentication information and the authentication ticket according to the embodiment.

The service acting server 400 includes an authentication ticket creating unit 402, a communication control unit 404, and a public key registration unit 410. The authentication ticket creating unit 402 has a function of creating the access authentication information according to the usage condition of the authentication license received by an authentication license receiving unit 406, and encrypting the access authentication information or adding an electronic signature using the authentication private key 2 (Sk2) to create the authentication ticket. The access authentication information 4022 and the authentication ticket 4024 will be discussed here based on FIG. 16. FIG. 16 is an explanatory view describing the contents of the access authentication information 4022 and the authentication ticket 4024.

As shown in FIG. 16, the access authentication information 4022 is substantially the same other than that the license is added to the access authentication information according to the first embodiment, and thus the detailed description will be omitted. The access authentication information 4022 may contain challenge (one-time ID and password information), and the like transmitted from the card issuing server. The access authentication information 4022 is added with the electronic signature data by the authentication private key 2 (Sk2) to create the authentication ticket 4024. The license may not be the target of the electronic signature data. Returning to FIG. 14, the authentication ticket created by the authentication ticket creating unit 402 is provided to the authentication ticket transmitting unit 408.

The communication control unit 404 is a communication interface configured to include a communication device and the like for connecting to the network such as Internet, and has a function of transmitting and receiving data with the information processing terminal 101, the service providing server 201, and the card issuing server 301 through the network. The communication control unit 404 includes an authentication license receiving unit 406, an authentication ticket transmitting unit 408, and the like. The authentication license receiving unit 406 has a function of receiving the authentication license created by the service providing server 201. The authentication ticket transmitting unit 408 has a function of transmitting the authentication ticket provided to the authentication ticket creating unit 402 to the card issuing server 301. The public key registration unit 410 has a function of registering the authentication public key 2 (Pk2) forming a pair with the authentication private key (Sk2) in the certificate authority 500 in advance.

The card issuing server 301 includes a communication control unit 303, a public key acquiring unit 304, an authentication license verifying unit 324, an authentication ticket verifying unit 307, a verification result notifying unit 308, an authentication information verifying unit 310, and the like. The communication control unit 303 is a communication interface configured to include a communication device to connect to the network such as Internet, and has a function of transmitting and receiving data with the information processing terminal 101 or the service acting server 400 through the network.

The communication control unit 303 includes an authentication ticket receiving unit 313, a connection information transmitting unit 315, an IC card accessing unit 316, and the like. The authentication ticket receiving unit 313 has a function of receiving the authentication ticket created by the service acting server 400, and providing the authentication ticket to the authentication license verifying unit 324. The connection information transmitting unit 315 has a function of transmitting the connection information to the client applicant 104 of the information processing terminal 100 along with the notification of the verification result by the verification result notifying unit 308. The IC card accessing unit 316 has a function of accessing the IC chip 150 of the information processing terminal 101, performing read or write of the IC card information etc. of the IC chip 150, and providing the information of the IC card to the authentication information verifying unit 310.

The public key acquiring unit 304 has a function of acquiring the authentication public key registered in the certificate authority 500 by the service providing server 201, and providing to the authentication ticket verifying unit 307. In the present embodiment, the public key acquiring unit 304 acquires the authentication public key 1 (Pk1) from the certificate authority.

The authentication license verifying unit 324 has a function of decrypting the received authentication license and verifying the authentication license. If the electronic signature is added to the authentication license, the authentication license verifying unit 324 verifies the relevant electronic signature using the authentication public key (Pk1), and checks the legitimacy of the authentication public key (Pk2) contained in the authentication license. The authentication ticket verifying unit 307 has a function of performing the electronic signature verification of the authentication ticket using the authentication public key (Pk2) which legitimacy is confirmed by the authentication license verifying unit 324, and verifying the legitimacy of the ticket. Similar to the authentication ticket verifying unit 306 of the first embodiment, the authentication ticket verifying unit 307 performs verification on the access authentication information of the authentication ticket. The authentication license verifying unit 324 provides the verification result of the authentication ticket to the verification result notifying unit 208.

The verification result notifying unit 308 has a function of notifying the verification result of the authentication ticket provided by the authentication ticket verifying unit 307 to the service acting server 400. The verification result notifying unit 308 provides the connection information for the information processing terminal 101 to connect to the card issuing server 301 to the connection information transmitting unit 315 along with the verification result of the authentication ticket. The authentication information verifying unit 310 has a function substantially the same as the authentication information verifying unit 310 of the card issuing server 300 according to the first embodiment, and thus detailed description will be omitted.

The function configuration of each device of the card issuing system 20 is as described above. The card issuing method executed in the card issuing system 20 will now be described. FIG. 17 is a timing chart showing a flow of the card issuing method executed in the card issuing system 20. As shown in FIG. 17, the service providing server 201 first encrypts the license information containing the information of the service to license the service acting server 400 to create the authentication license (S402). The service providing server 201 transmits the authentication license created in step S402 to the service acting server 400 (S404).

The client applicant 104 transmits the access authentication information to the service acting server 400 (S406). In the transmission of the access authentication information by the client applicant 104 in step S406, transmission may be performed after the authentication license is transmitted from the service providing server 201, or transmission may be performed in advance. The service acting server transmitted with the authentication license from the service providing server 201 in step S404, and transmitted with the access authentication information from the client applicant 104 in step S406 creates the authentication ticket based on the authentication license and the access authentication information (S408). The service acting server 400 transmits the authentication ticket created in step S408 to the card issuing server 301 (S410).

The card issuing server 301 transmitted with the authentication ticket from the service acting server 400 in step S410 decrypts the authentication license contained in the authentication ticket and verifies the authentication license (S414). As described above, if the electronic signature data is added to the authentication ticket and the authentication license, the electronic signature contained in the authentication ticket is verified using the authentication public key 1 (Pk1), and the legitimacy of the authentication public key 2 (Pk2) contained in the authentication license may be confirmed. After the verification of the authentication license in step S414, verification of the authentication ticket is performed (S416). As described above, if the electronic signature data is added to the authentication ticket, the electronic signature verification of the authentication ticket is performed using the authentication public key 2 (Pk2) contained in the authentication license to verify the authentication ticket.

The verification result of the authentication ticket verified in step S416 is transmitted to the service acting server 400 (S418). The connection information for the client applicant 104 to connect with the card issuing server 301 is transmitted to the service acting server (S420). The service acting server 400 transmitted with the connection information from the card issuing server 301 in step S420 transmits the relevant connection information to the client applicant 104 (S422).

The client applicant 104 transmitted with the connection information to the card issuing server 301 from the service acting server 400 in step S422 connects to the card issuing server 301 based on the relevant connection information (S424). The card issuing server 301 connected to the client applicant 104 in step S424 checks the legitimacy of the client applicant 104 from the connection status from the client applicant 104, and the individual information of the client applicant 104, and accesses the IC chip 150 (S426).

The individual information of the IC card of the IC chip 150 acquired by accessing the IC chip 150 in step S426 and the access authentication information of the authentication ticket are compared and verified (S428). When the legitimacy of the IC card is confirmed as a result of the verification in step S428, write of the card information of the IC card to the IC chip 150, and the update of the card information are performed (S430). The card issuing method executed in the card issuing system 20 is as described above.

The card issuing system 20 according to the third embodiment is as described above. According to the card issuing system 20, the authentication license capable of executing only the process the service providing server 201 requests the service acting server 400 is created, and the authentication ticket is created based on the authentication license. Thus, when the service providing server 201 requests for an alternate processing to the service acting server 400, the executable process can be limited while maintaining security by having the authentication ticket as a multi-stage configuration. Furthermore, according to the multi-stage configuration of using different authentication keys for the authentication license and the authentication ticket, authentication is mutually possible even when the service providing server 201 has the service acting server 400 and the like carry out the processes.

It should be understood by those skilled in the art that various modifications, combinations, sub-combinations and alterations may occur depending on design requirements and other factors insofar as they are within the scope of the appended claims or the equivalents thereof.

For instance, in the above embodiment, the card issuing server performs authentication of the information processing terminal using the authentication ticket, but the present invention is not limited to such example. For instance, in the authentication with the service providing server, authentication may be performed by an authentication method using challenge response. Thus, the card issuing server may combine the authentication using the authentication ticket, and the authentication using the challenge response to perform authentication. What authentication method to use may be determined based on the selection of the service providing server.

What is claimed is:

1. A card issuing system, including:
an information processing terminal which is equipped with an IC chip, and
a service providing server and a card issuing server which are connectable to the information processing terminal via a network, wherein
the service providing server includes
an authentication ticket creating unit configured to encrypt access authentication information, for authenticating access by the information processing terminal, to create an authentication ticket, and
an authentication ticket transmitting unit configured to transmit the authentication ticket created by the authentication ticket creating unit to the card issuing server,
the card issuing server includes
an authentication ticket verifying unit configured to decrypt the authentication ticket transmitted by the authentication ticket transmitting unit, and verify the authentication ticket, a verification result notifying unit configured to notify the service providing server of a verification result of the authentication ticket verified by the authentication ticket verifying unit, a connection information transmitting unit configured to transmit to the service providing server connection information for connecting to the card issuing server along with the verification result of the authentication ticket, an IC card accessing unit configured to receive access authentication information from the IC chip after a transmission of the connection information, and an authentication information verifying unit configured to compare and verify the access authentication information of the authentication ticket and the access authentication information received from the IC chip of the information processing terminal, and the information processing terminal includes a connecting unit configured to connect to the card issuing server based on the connection information, and an authentication information storage unit configured to store the access authentication information received by the IC card accessing unit, the authentication information storage unit being disposed in the IC chip.

2. A card issuing server connectable to an information processing terminal equipped with an IC chip and to a service providing server via a network, wherein the service providing server encrypts access authentication information, for authenticating access by the information processing terminal, to create an authentication ticket, the card issuing server comprising:

an authentication ticket receiving unit configured to receive the authentication ticket created by the service providing server;

an authentication ticket verifying unit configured to decrypt the authentication ticket received by the authentication ticket receiving unit, and verify the authentication ticket;

a verification result notifying unit configured to notify the service providing server of a verification result of the authentication ticket verified by the authentication ticket verifying unit;

a connection information transmitting unit configured to transmit to the service providing server connection information for connecting to the card issuing server along with the verification result of the authentication ticket;

an IC card accessing unit configured to receive access authentication information from the IC chip after a transmission of the connection information; and an authentication information verifying unit configured to compare and verify the access authentication information of the authentication ticket and the access authentication information received from the IC chip of the information processing terminal.

3. The card issuing server according to claim 2, wherein the service providing server adds an electronic signature to the access authentication information for authenticating access by the information processing terminal using an authentication private key, and creates the authentication ticket, and the authentication ticket verifying unit verifies the electronic signature added to the authentication ticket using an authentication public key which corresponds to the authentication private key.

4. The card issuing server according to claim 2, wherein the card issuing server is connected to a service acting server configured to act for the service providing server via the network, the service providing server encrypts information of a service licensed to the service acting server and creates an authentication license, the service acting server adds to the authentication license the access authentication information for authenticating access by the information processing terminal, and encrypts to create the authentication ticket, the card issuing server further comprising:

an authentication license acquiring unit configured to decrypt the authentication ticket, and acquire the authentication license; and an authentication license verifying unit configured to decrypt the authentication license acquired by the authentication license acquiring unit, and verify the authentication license, and the authentication ticket verifying unit verifies the authentication ticket based on the authentication license verified by the authentication license verifying unit.

5. The card issuing server according to claim 4, wherein the service providing server adds a first electronic signature to user authentication information using a first authentication private key to create the authentication license, the service acting server adds the access authentication information for authenticating access by the information processing terminal to the authentication license, and further adds a second electronic signature using a second authentication private key to create the authentication ticket, the authentication license verifying unit verifies the first electronic signature added to the authentication license using a first authentication public key which corresponds to the first authentication private key, and the authentication ticket verifying unit verifies the second electronic signature added to the authentication ticket using a second authentication public key which corresponds to the second authentication private key included in the authentication license verified by the authentication license verifying unit.

6. The card issuing server according to claim 2, wherein the access authentication information for authenticating access by the information processing terminal includes at least process information used by the information processing terminal, identification information of the IC chip, and issuing source information of the IC chip.

7. The card issuing server according to claim 2, wherein the access authentication information for authenticating access by the information processing terminal includes write judgment information for determining whether it is possible to write to the IC chip, and the authentication information verifying unit determines a writing to the IC chip based on the write judgment information.

8. The card issuing server according to claim 2, wherein the access authentication information for authenticating access by the information processing terminal includes control information of a device allowed to write data to the IC chip or to use data written to the IC chip.

9. The card issuing server according to claim 2, further comprising:

a challenge response authentication unit configured to authenticate the service providing server by a challenge response authentication.

10. The card issuing server according to claim 9, wherein the challenge response authentication unit authenticates the service providing server by the challenge response authentication.

11. The card issuing server according to claim 2, further comprising:

an access status notifying unit configured to notify an access status to the IC chip of the information processing terminal in response to a request of the service providing server.

12. The card issuing server according to claim 11, wherein the access status notifying unit includes an access authentication information transmitting unit configured to transmit the access authentication information received from the IC chip to the service providing server in response to a request of the service providing server.

13. A card issuing system, comprising:
an information processing terminal which is equipped with an IC chip; and
a service providing server and a card issuing server which are connectable to the information processing terminal via a network, wherein
the service providing server includes
an authentication ticket creating unit configured to encrypt access authentication information, for authenticating access by the information processing terminal, to create an authentication ticket, and
an authentication ticket transmitting unit configured to transmit the authentication ticket created by the authentication ticket creating unit to the information processing terminal,
the information processing terminal includes
an authentication ticket transmitting unit configured to transmit to the card issuing server the authentication ticket transmitted by the authentication ticket transmitting unit included in the service providing server, and
the card issuing server includes
an authentication ticket verifying unit configured to decrypt the authentication ticket transmitted by the authentication ticket transmitting unit included in the information processing terminal, and verify the authentication ticket,
a verification result notifying unit configured to notify the information processing terminal of a verification result of the authentication ticket verified by the authentication ticket verifying unit,
a connection information transmitting unit configured to transmit to the information processing terminal connection information for connecting to the card issuing server along with the verification result of the authentication ticket,
an IC card accessing unit configured to receive access authentication information from the IC chip after a transmission of the connection information, and
an authentication information verifying unit configured to compare and verify the access authentication information of the authentication ticket and the access authentication information received from the IC chip of the information processing terminal.

14. A card issuing server connectable to an information processing terminal equipped with an IC chip and to a service providing server via a network, wherein the service providing server encrypts access authentication information, for authenticating access by the information processing terminal, to create an authentication ticket, the card issuing server comprising:
an authentication ticket receiving unit configured to receive the authentication ticket created by the service providing server through the information processing terminal;
an authentication ticket verifying unit configured to decrypt the authentication ticket received by the authentication ticket receiving unit, and verify the authentication ticket;
a verification result notifying unit for notifying the information processing terminal of a verification result of the authentication ticket verified by the authentication ticket verifying unit;
a connection information transmitting unit configured to transmit to the information processing terminal connection information for connecting to the card issuing server based on the verification result of the authentication ticket;
a communication control unit configured to connect to the information processing terminal after a transmission of the connection information; and
an authentication information verifying unit configured to compare and verify the access authentication information of the authentication ticket and access authentication information stored in the IC chip of the information processing terminal.

15. A card issuing system, comprising:
an information processing terminal which is equipped with an IC chip; and
a service providing server, a service acting server and a card issuing server which are connectable to the information processing terminal via a network, wherein
the service providing server includes
an authentication license creating unit configured to encrypt information of a service licensed to the service acting server, and create an authentication license, and
an authentication license transmitting unit configured to transmit the authentication license created by the authentication license creating unit to the service acting server,
the service acting server includes
an authentication ticket creating unit configured to add access authentication information for authenticating an access by the information processing terminal to the authentication license transmitted by the authentication license transmitting unit, and encrypt to create an authentication ticket, and
an authentication ticket transmitting unit configured to transmit the authentication ticket created by the authentication ticket creating unit to the card issuing server, and
the card issuing server includes
an authentication license acquiring unit configured to decrypt the authentication ticket transmitted by the authentication ticket transmitting unit, and acquire the authentication license,
an authentication license verifying unit configured to decrypt the authentication license acquired by the authentication license acquiring unit, and verify the authentication license, an authentication ticket verifying unit configured to verify the authentication ticket based on the authentication license verified by the authentication license verifying unit, and
a communication control unit configured to connect to the information processing terminal based on a verification of the authentication ticket.

16. A card issuing method realized by using an information processing terminal which is equipped with an IC chip, and a service providing server and a card issuing server which are connectable to the information processing terminal via a network, the method comprising:

by the service providing server,
- encrypting access authentication information for authenticating an access by the information processing terminal, to create an authentication ticket; and
- transmitting the authentication ticket to the card issuing server, by the card issuing server,
- decrypting the authentication ticket transmitted by the service providing server, and verifying the authentication ticket;
- notifying the service providing server of a verification result of the verified authentication ticket;
- transmitting to the service providing server connection information for connecting to the card issuing server along with the verification result of the authentication ticket;
- receiving access authentication information from the IC chip after the transmitting; and
- comparing and verifying the access authentication information of the authentication ticket and the access authentication information received from the IC chip of the information processing terminal; and by the information processing terminal, connecting to the card issuing server based on the connection information.

17. A card issuing method realized by using an information processing terminal which is equipped with an IC chip, and a service providing server and a card issuing server which are connectable to the information processing terminal via a network, the method comprising:

by the service providing server,
- encrypting access authentication information, for authenticating an access by the information processing terminal, to create an authentication ticket; and
- transmitting the authentication ticket to the information processing terminal;

by the information processing terminal, transmitting the authentication ticket transmitted by the service providing server to the card issuing server; and by the card issuing server,
- decrypting the transmitted authentication ticket, and verifying the authentication ticket;
- notifying the information processing terminal of a verification result of the verified authentication ticket;
- transmitting to the information processing terminal connection information for connecting to the card issuing server along with the verification result of the authentication ticket;
- receiving access authentication information from the IC chip after the transmitting; and
- comparing and verifying the access authentication information of the authentication ticket and the access authentication information received from the IC chip of the information processing terminal.

18. A card issuing method realized by using an information processing terminal which is equipped with an IC chip, and a service providing server, a service acting server and a card issuing server which are connectable to the information processing terminal via a network, the method comprising:

by the service providing server,
- encrypting information of a service licensed to the service acting server, and creating an authentication license; and
- transmitting the authentication license to the service acting server, by the service acting server,
- adding to the transmitted authentication license access authentication information for authenticating an access by the information processing terminal, and encrypting to create an authentication ticket; and
- transmitting the authentication ticket to the card issuing server; and by the card issuing server,
- decrypting the authentication ticket, and acquiring the authentication license;
- decrypting the acquired authentication license, and verifying the authentication license;
- verifying the authentication ticket based on the verified authentication license; and
- connecting to the information processing terminal based on the verifying the authentication ticket.

19. A non-transitory computer-readable storage medium encoded with a program for causing a computer to perform a method as a card issuing server connectable to an information processing terminal mounted with an IC chip and to a service providing server via a network, wherein the service providing server encrypts access authentication information, for authenticating an access by the information processing terminal, to create an authentication ticket, and the method comprises:

- receiving the authentication ticket created by the service providing server,
- decrypting the authentication ticket received by the receiving, and verifying the authentication ticket,
- notifying the service providing server of a verification result of the authentication ticket verified by the verifying,
- transmitting to the service providing server connection information for connecting to the card issuing server along with the verification result of the authentication ticket,
- receiving access authentication information from the IC chip after the transmitting, and
- comparing and verifying the access authentication information of the authentication ticket and the access authentication information received from the IC chip of the information processing terminal.

20. The storage medium according to claim 19, wherein the card issuing server is connected to a service acting server configured to act for the service providing server via the network, the service providing server encrypts information of a service licensed to the service acting server and creates an authentication license, the service acting server adds to the authentication license access authentication information for authenticating an access by the information processing terminal, and encrypts to create the authentication ticket, the method further comprises
- decrypting the authentication ticket, and acquiring the authentication license, and
- decrypting the authentication license acquired by the acquiring, and verifying the authentication license, and the verifying includes verifying the authentication ticket based on the authentication license.

21. A non-transitory computer-readable storage medium encoded with a program for causing a computer to perform a method as a card issuing server connectable to an information processing terminal equipped with an IC chip and a service providing server via a network, wherein the service providing server encrypts access authentication information, for authenticating an access by the information processing terminal, to create an authentication ticket, and the method comprises:

receiving the authentication ticket created by the service providing server through the information processing terminal, decrypting the authentication ticket received by the receiving, and verifying the authentication ticket, notifying the information processing terminal of a verification result of the authentication ticket verified by the verifying, transmitting to the information processing terminal connection information for connecting to the card issuing server based on the verification result of the authentication ticket;

connecting to the information processing terminal after the transmitting; and comparing and verifying the access authentication information of the authentication ticket and access authentication information stored in the IC chip of the information processing terminal.

\* \* \* \* \*